(12) United States Patent
Barsness et al.

(10) Patent No.: US 7,725,498 B2
(45) Date of Patent: May 25, 2010

(54) TECHNIQUES FOR IDENTIFYING MERGEABLE DATA

(75) Inventors: Eric L. Barsness, Pine Island, MN (US);
Peter J. Johnson, Rochester, MN (US);
Michael P. Koranda, Rochester, MN (US); Randy W. Ruhlow, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1443 days.

(21) Appl. No.: 10/829,624

(22) Filed: Apr. 22, 2004

(65) Prior Publication Data
US 2005/0240615 A1 Oct. 27, 2005

(51) Int. Cl.
*G06F 7/00* (2006.01)
*G06F 17/30* (2006.01)
(52) U.S. Cl. .................... 707/803; 707/809
(58) Field of Classification Search ................ 707/1, 707/101; 715/509
See application file for complete search history.

(56) References Cited

U.S. PATENT DOCUMENTS

| | | | | |
|---|---|---|---|---|
| 6,044,383 | A | * 3/2000 | Suzuki et al. | 715/509 |
| 2003/0217033 | A1 | * 11/2003 | Sandler et al. | 707/1 |
| 2004/0073565 | A1 | * 4/2004 | Kaufman et al. | 707/101 |

* cited by examiner

*Primary Examiner*—John E Breene
*Assistant Examiner*—Giovanna Colan
(74) *Attorney, Agent, or Firm*—Patterson & Sheridan, LLP

(57) ABSTRACT

A system, method and article of manufacture for identifying mergeable data in a data processing system and, more particularly, for identifying correlated columns from one or more database tables. One embodiment comprises determining correlation attributes for a first column and a second column from one or more database tables. The correlation attributes describe for each column at least one of the column and content of the column. The correlation attributes from the first and second column are compared and similarities between the first and second column are identified on the basis of the comparison. Then, on the basis of the identified similarities, it is determined whether the first and second columns are correlated. Only if the columns are determined to be correlated, the first and second columns are merged.

44 Claims, 16 Drawing Sheets

TECHNIQUES FOR IDENTIFYING MERGEABLE DATA

CROSS-REFERENCE TO RELATED APPLICATIONS:

The present application is related to commonly owned, co-pending U.S. patent application entitled "Techniques for Providing Measurement Units Metadata," filed concurrently herewith on Apr. 22, 2004 Ser. No. 10/829,613, which is incorporated herein by reference.

BACKGROUND OF THE INVENTION

1. Field of the Invention

The present invention generally relates to identifying mergeable data in a data processing system and, more particularly, to identifying correlated columns from one or more database tables.

2. Description of the Related Art

Databases are computerized information storage and retrieval systems which can be organized in multiple different ways. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

An overall database organization is typically referred to as a schema for the database, such as a hierarchical or relational schema. A database schema is often compactly expressed using table names and names of columns in tables. Accordingly, a database may contain multiple tables, each containing a plurality of columns. The tables can be populated with data from different data sources. For instance, assume a pharmaceutical company having a database with a multiplicity of tables, each having a plurality of columns for storing data collected from different investigators. By way of example, the database includes two tables from two different investigators, i.e., a "Results Allergy A" table from a first investigator and a "Allergy A results" table from a second investigator. The two tables could be expressed as:

Results Allergy A (Patient Name, . . . , Address, . . . )

Allergy A Results (Patient, Location, . . . )

Both tables store information about an investigation concerning an allergy A which has been performed with respect to a multiplicity of individuals. The "Results Allergy A" table has been created by the first investigator for storing investigation results from the first investigator. Specifically, the "Results Allergy A" table contains personal information for the multiplicity of individuals, such as names and addresses, and additional information relevant to the allergy A and aspects of the investigation in a multiplicity of columns "PatientName", "Address" etc. Each row of the "Results Allergy A" table is associated with a specific individual. The "Allergy A Results" table has been created by the second investigator for storing investigation results from the second investigator. The "Allergy A Results" table contains personal information for the multiplicity of individuals and additional information relevant to the allergy A and aspects of the investigation in a multiplicity of columns "Patient", "Location", etc. Assume now that the pharmaceutical company wants to determine triggering factors for the allergy A. To this end, the pharmaceutical company would analyze all collected data from both tables. To efficiently analyze the collected data, it is desirable to merge both tables into a single table.

However, one difficulty when merging independently created database tables consists in identifying correlated columns in the database tables which are mergeable to create a meaningful merged result. For example, assume that each of the two distinct database tables "Results Allergy A" and "Allergy A results" has 175 columns. By joining these two tables, a new table having 350 columns is obtained. However, in order to determine how these tables can be merged efficiently, a database administrator would need to compare each column of the 175 columns of the "Results Allergy A" table to each column of the 175 columns of the "Allergy A results" table to determine mergeable columns. In the given example, the database administrator may accordingly determine that the "PatientName" and the "Patient" columns both contain names of individual patients and that the "Address" and "Location" columns both contain address information for the patients. Accordingly, the database administrator could merge the columns "PatientName" and "Patient" into a column "Patient Name" and the columns "Address" and "Location" into a column "Patient Address" in order to provide a single resultant table "Allergy A Investigation" which can be expressed as follows:

Allergy A Investigation(Patient Name, Patient Address, . . . )

However, even if the database administrator knows the exact meaning of each column in the two distinct database tables "Results Allergy A" and "Allergy A results", this is a tedious process depending on the number of columns to be compared.

Therefore, there is a need for an efficient technique for identifying correlated columns from one or more database tables.

SUMMARY OF THE INVENTION

The present invention is generally directed to a method, system and article of manufacture for identifying mergeable data in a data processing system and, more particularly, for identifying correlated columns from one or more database tables.

One embodiment provides a computer-implemented method for identifying correlated columns from database tables. The method comprises determining correlation attributes for a first column and a second column from one or more database tables. The correlation attributes describe for each column at least one of the column and content of the column. The correlation attributes from the first and second column are compared and similarities between the first and second column are identified on the basis of the comparison. Then, on the basis of the identified similarities, it is determined whether the first and second columns are correlated. Only if the columns are determined to be correlated, the first and second columns are merged.

Another embodiment provides another computer-implemented method for identifying correlated columns from database tables. The method comprises determining metadata for at least two columns from one or more database tables. The metadata describes characteristics of each column. Furthermore, content from the at least two columns from the one or more database tables is analyzed. Then, a degree of correlation between the at least two columns is determined using the determined metadata and the analyzed content.

Still another embodiment provides a computer readable medium containing a program which, when executed, performs a process for identifying correlated columns from database tables. The process comprises determining correlation attributes for a first column and a second column from one or more database tables. The correlation attributes describe for each column at least one of the column and content of the column. The correlation attributes from the first and second column are compared. On the basis of the comparison, similarities between the first and second column are identified. Then, on the basis of the identified similarities, it is determined whether the first and second columns are correlated. Only if the columns are determined to be correlated, the first and second columns are merged.

Still another embodiment provides another computer readable medium containing a program which, when executed, performs a process for identifying correlated columns from database tables. The process comprises determining metadata for at least two columns from one or more database tables. The metadata describes characteristics of each column. Furthermore, content from the at least two columns from the one or more database tables is analyzed. Then, a degree of correlation between the at least two columns is determined using the determined metadata and the analyzed content.

Still another embodiment provides a data processing system comprising at least one database having one or more database tables, and a correlation manager for identifying correlated columns from the one or more database tables. The correlation manager is configured for determining correlation attributes for a first column and a second column from the one or more database tables. The correlation attributes describe for each column at least one of the column and content of the column. The correlation manager is further configured for comparing the correlation attributes from the first and second column and for identifying similarities between the first and second column on the basis of the comparison. Moreover, the correlation manager is configured for determining on the basis of the identified similarities whether the first and second columns are correlated and for merging the first and second columns only if the columns are determined to be correlated.

Still another embodiment provides a data processing system comprising at least one database having one or more database tables, and a correlation manager for identifying correlated columns from the one or more database tables. The correlation manager is configured for determining metadata for at least two columns from the one or more database tables. The metadata describes characteristics of each column. The correlation manager is further configured for analyzing content from the at least two columns from the one or more database tables. Moreover, the correlation manager is configured for determining a degree of correlation between the at least two columns using the determined metadata and the analyzed content.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
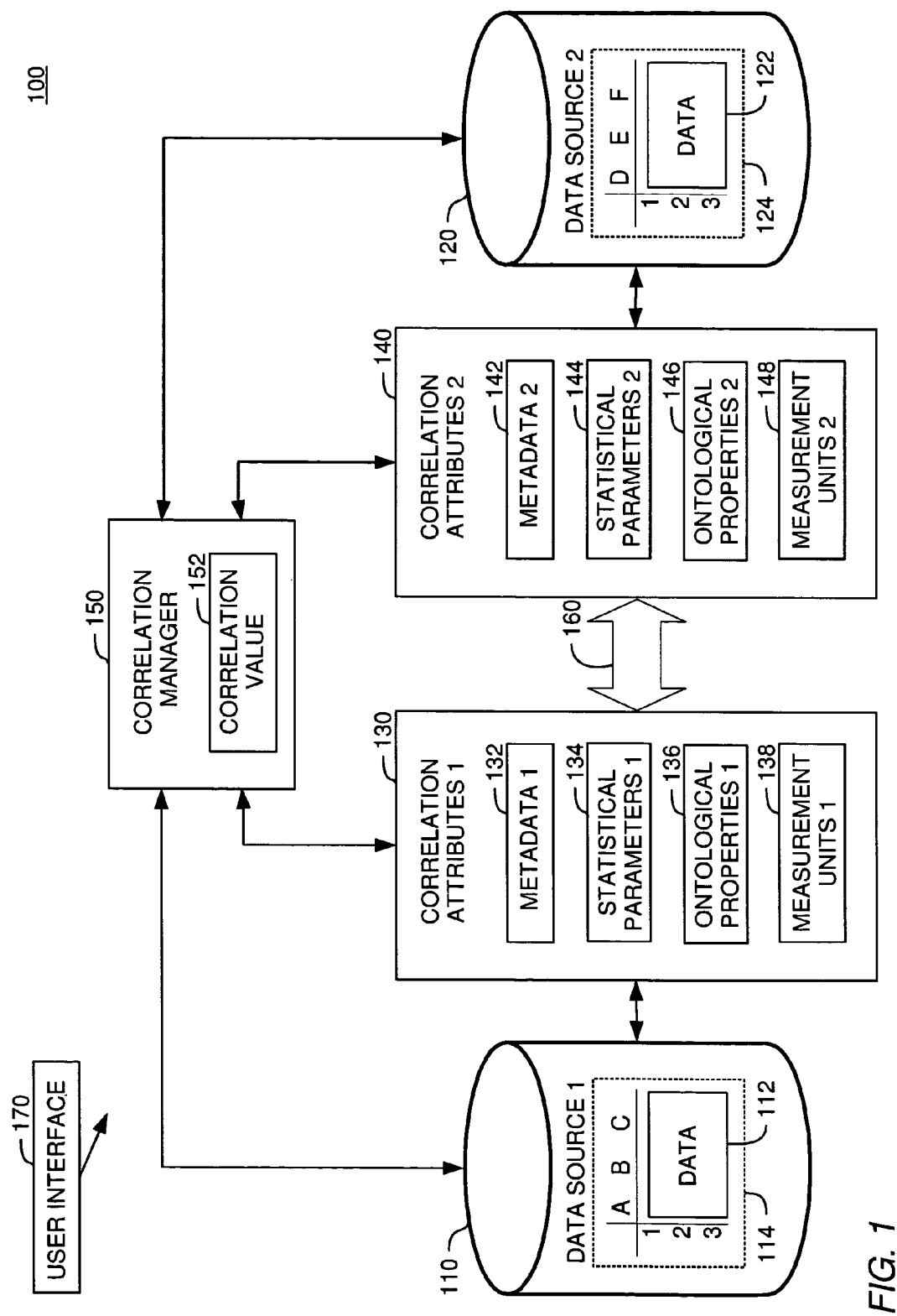
FIG. 1 is a relational view of components implementing one aspect of the invention.

The present invention is generally directed to a method, system and article of manufacture for identifying mergeable data in a data processing system and, more particularly, for identifying correlated columns from one or more database tables. The correlated columns are identified in order to facilitate merging of the correlated columns.

In one embodiment, correlation attributes for a first column and a second column from one or more database tables are determined. The correlation attributes for each column describe at least one of the column and content of the column. According to one aspect, the correlation attributes are determined on the basis of: (i) metadata describing characteristics of each column or content therein, (ii) statistical parameters associated with each column or content therein, (iii) ontological properties describing cognitive qualities associated with each column or content therein, and (iv) measurement units associated with each column or content therein. By comparing the correlation attributes from the first and second column, similarities between the first and second column can be identified. On the basis of the identified similarities, it can be determined whether the first and second columns are correlated.

According to another embodiment, metadata for at least two columns from one or more database tables is determined. Furthermore, content from the at least two columns from the one or more database tables is analyzed. Using the determined metadata and the analyzed content, a degree of correlation between the at least two columns can be determined.

According to one aspect, if it is determined that the first and second column or the at least two columns are correlated, a user is notified. For instance, a message is displayed to the user indicating that the first and second column or the at least two columns can potentially be merged. Thus, in response to user input, the first and second column or the at least two columns are merged into a single column.

The invention provides for numerous embodiments. For instance, according to aspects of the invention, metadata of different columns is compared. Accordingly, if column names are the same or if different columns are defined in a similar manner, these columns are identified as candidates for merging. Furthermore, if a check constraint is defined over columns in different tables that limits values in the columns in a similar manner, this also indicates some degree of correlation. Range constraints and triggers defined over columns would also fit into this category. Furthermore, COMMENT ON metadata information can be used in comparisons. The above described elements are examples of metadata related correlation attributes. Similarly to metadata, ontology relationships can be used to determine correlated columns. For instance, ontological tree structures containing relevant and/or cognitive qualities of a concept can be determined and a comparison for determining matches between column names and concepts in these structures can be performed. Accordingly, two columns in disparate datasets which represent the same concept are considered to be correlated. Furthermore, contents of the columns can be analyzed. For instance, assume columns declared as CHARACTER fields and which contain DATE strings. Obviously, if two different columns contain data representing DATE strings, these columns are identified as candidates for merging. Likewise, data represented by a CHARACTER field in the database which contains both character and numeric values, where the numeric values represent a quantity, can be analyzed. By way of example, the content of a first column may have the values 8 lbs, 10 lbs, etc. Hence, if this type of data matches with, or is similar to, data from another column, this also indicates some degree of correlation. In one embodiment, data hashing techniques over data are used to identify such similarities. Likewise, bitmap joining could be used to see if correlations exist. Furthermore, statistics can be used when correlating numeric fields. For example, minimum, maximum, and mean values can be calculated for different columns. Column statistics can also be used to estimate what the contents of the columns are in order to allow further correlation determination. An example is a column with a minimum value of 50, a maximum value of 200, a mean value of 120 and a column name "BP". This column has a high probability of being a column storing diastolic blood pressure readings. This column would be given a high correlation with diastolic columns from other tables being joined. Furthermore, mergeable columns can be determined using "units" associated with columns. The "units" are the measurement units associated with values in the columns. For instance, some values may be numeric and represent milligrams, whereas other values may be equivalent but in different units such as "ounces" or "grains". However, both values relate to data directed to masses or weights.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer, although the client-server model is merely illustrative, and not limiting of the invention. Furthermore, embodiments of the present invention can apply to any comparable hardware configuration, regardless of whether the computer systems are complicated, multi-user computing apparatuses, single-user workstations, or network appliances that do not have non-volatile storage of their own.

Moreover, embodiments of the invention can be described with reference to a database management system (DBMS) structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database. However, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a relational view of components implementing one aspect of the invention is illustrated. The components illustratively include a user interface 170, a correlation manager 150 and two data sources, i.e., a first data source 110 "DATA SOURCE 1" and a second data source 120 "DATA SOURCE 2". The user interface 170 is configured for allowing user interaction with the correlation manager 150 and the two data sources 110 and 120. For instance, the user interface 170 can be used for entering data, such as data 112 and 122 and/or metadata, into the data sources 110 and 120. The user interface 170 may further be used for entering queries to be executed against the data sources 110 and 120. The configuration manager 150 is configured for identifying mergeable data from the first and second data sources 110 and 120. The configuration manager 150 can further be configured for merging the identified mergeable data in response to input from a user.

The data sources 110 and 120 are representative of any collection of data regardless of the particular physical representation. Illustratively, the data source 110 includes data 112 and the data source 120 includes data 122. In one embodiment, the data sources 110, 120 represent databases and the data 112, 122 represents objects within the databases. For example, the data 112, 122 may represent tables (and their respective contents) defined by columns and rows, as illustrated by tables 114 and 124, respectively. Although shown as separate physical sources, the data sources 110 and 120 may represent the same data source (i.e., database) and the data 112, 122 may represent different columns of the same table. By way of illustration, the data sources 110 and 120 may be databases organized according to a relational schema (accessible by SQL queries) or according to an XML schema (accessible by XML queries). However, the invention is not limited to a particular physical representation or schema and contemplates extension to schemas presently unknown. As used herein, the term "schema" generically refers to a particular arrangement of data.

In one embodiment, the correlation manager 150 determines correlation attributes 130 for each column of the tables defining the data 112 and correlation attributes 140 for each column of the tables defining the data 122. The correlation attributes 130 and 140 can be stored together with or separately from the data 112 and 122, respectively. Furthermore, the correlation attributes 130 and 140 can be included with (i.e., as part of) the data 112 and 122, respectively. Illustratively, the correlation attributes 130 and 140 are shown separate from the data 122 and 122. The correlation attributes for each column describe at least one of the column and content of the column. Illustratively, the correlation attributes 130 are determined on the basis of metadata 132 "METADATA 1", statistical parameters 134 "STATISTICAL PARAMETERS 1", ontological properties 136 "ONTOLOGICAL PROPERTIES 1" and measurement units 138 "MEASUREMENT UNITS 1" related to each column of the table(s) defining the data 112. The correlation attributes 140 are determined on the basis of metadata 142 "METADATA 2", statistical parameters 144 "STATISTICAL PARAMETERS 2", ontological properties 146 "ONTOLOGICAL PROPERTIES 2" and measurement units 148 "MEASUREMENT UNITS 2" related to each column of the table(s) defining the data 122.

According to one aspect, the correlation manager 150 identifies similarities between columns of the table(s) defining the data 112 and columns of the table(s) defining the data 122. To this end, the correlation manager 150 compares the correlation attributes 130 from each column of the data 112 with the correlation attributes 140 from each column of the data 122, as indicated by an arrow 160. More specifically, the correlation manager 150 determines one correlation value 152 for each column of the data 112 with respect to each column of the data 122 on the basis of the comparison of the respective correlation attributes 130 and 140. Thus, each correlation value 152 indicates a degree of similarity between two different columns. Accordingly, the correlation manager 150 can identify correlated columns using the correlation values 152. In one embodiment, if the correlation value 152 for two given columns exceeds a predetermined threshold, it is assumed that the two given columns are correlated and can potentially be merged into a single column. An exemplary embodiment of an operation of the correlation manager 150 for determining correlated columns is described below with reference to FIGS. 2-9.

Figure 2:
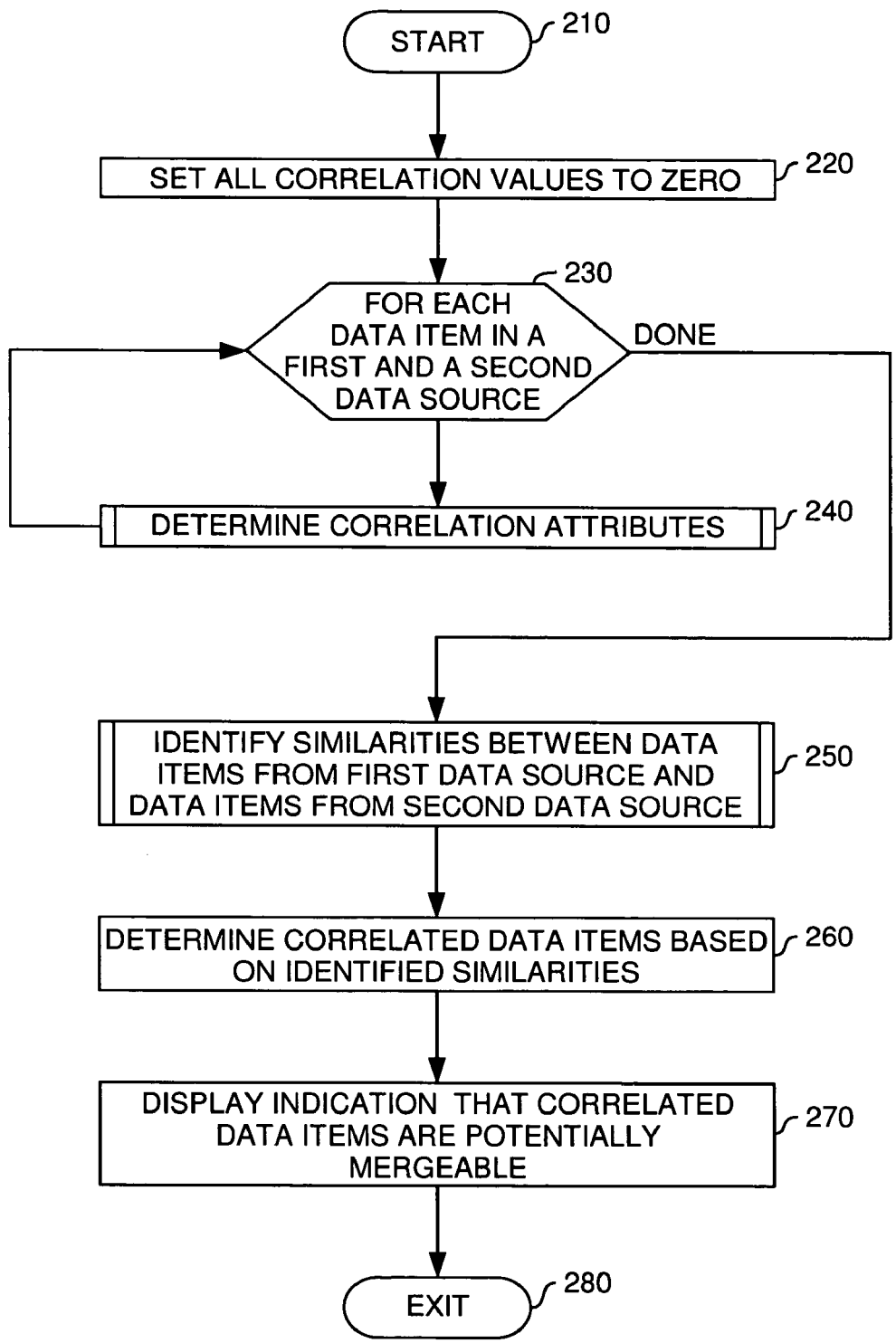
FIG. 2 is a flow chart illustrating identification of mergeable data items in one embodiment.

Referring now to FIG. 2, one embodiment of a method 200 for identifying correlations between different columns of database tables is shown. However, it should be noted that the method 200 is generally suitable for determining correlations between any available data items (e.g., data 112 and 122 of FIG. 1) from different data sources (e.g., data sources 110 and 120 of FIG. 1). Furthermore, the method 200 is suitable for determining correlations between data items of a single data source. By way of example, the method 200 can be used for determining correlations between columns of a single database table. Thus, it is understood that the method 200 is explained in the following with respect to columns of a first and a second database table merely for purposes of illustration, and that the invention is not so limited. At least part of the steps of the method 200 can be performed by a correlation manager (e.g., correlation manager 150 of FIG. 1). Method 200 starts at step 210.

In one embodiment, at step 220 each column of the first database table is associated with one or more correlation values (e.g., correlation value(s) 152 of FIG. 1) according to a number of columns included in the second database table. Accordingly, for a given column of the first database, each associated correlation value describes a degree of correlation with a specific column of the second database table. All associated correlation values are initially set to zero.

At step 230, a loop consisting of steps 230 and 240 is entered for each column of the first and second database tables. At step 240, correlation attributes (e.g., correlation attributes 130 or 140 of FIG. 1) are determined for each column. In one embodiment, the correlation attributes for each column are determined on the basis of: (i) metadata describing characteristics of the column, (ii) statistical parameters associated with the column, (iii) ontological properties describing cognitive qualities associated with the column, and (iv) measurement units associated with the column. An exemplary method illustrating determination of correlation attributes in one embodiment is described below with reference to FIG. 3. When the loop consisting of steps 230 and 240 has been performed for each column of the first and second database tables, the method 200 continues at step 250.

At step 250, similarities between the columns of the first and second database tables are determined. An exemplary method illustrating determination of similarities between different columns in one embodiment is described below with reference to FIG. 4. Generally, the correlation attributes from each column of the first database are compared with the correlation attributes from each column of the second database. On the basis of each comparison, the corresponding correlation value is adjusted.

At step 260, correlated columns are determined on the basis of the identified similarities. More specifically, for each adjusted correlation value a decision is made in order to determine whether the correlation value indicates a correlation of the associated columns. By way of example, each correlation value can be compared with a predetermined threshold. If the correlation value exceeds the predetermined threshold, it can be assumed that the columns associated with the correlation value are correlated. In specific cases, more than one correlation value for a given column may exceed the predetermined threshold. In such cases, it can be assumed that the given column is correlated with more than one other column.

At step 270, a message is displayed to a user indicating the determined correlated columns. In one embodiment, the user can thus make a decision on whether to merge the determined correlated columns. Accordingly, in response to an appropriate input from the user, the determined correlated columns are merged. Method 200 then exits at step 280.

Figure 3:
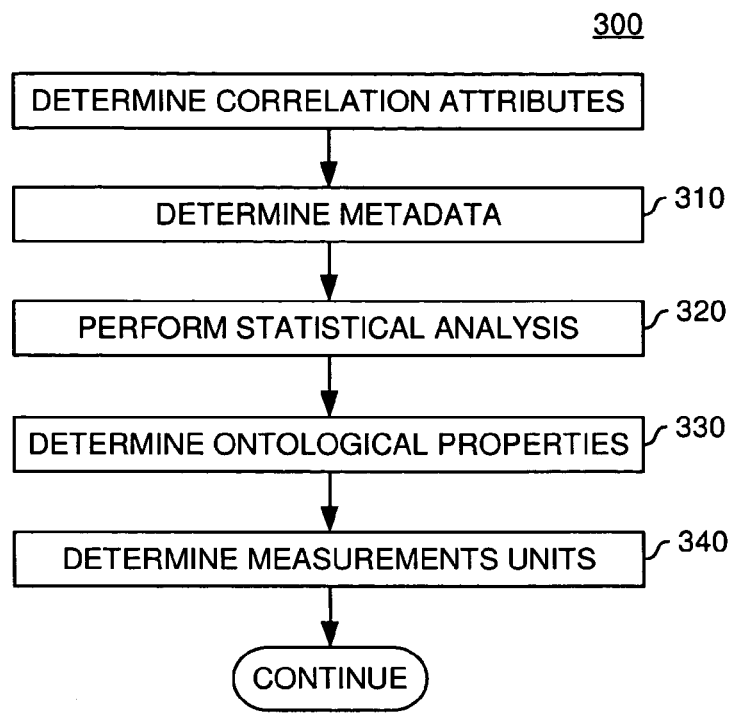
FIG. 3 is a flow chart illustrating determination of correlation attributes in one embodiment.

Referring now to FIG. 3, one embodiment of a method 300 illustrating determination of correlation attributes according to step 240 of FIG. 2 is shown. In one embodiment, the method 300 is performed for each column of the first and second database tables.

At step 310, corresponding metadata (e.g., metadata 132 and 142 of FIG. 1) is determined. The metadata describes characteristics of each column. For example, the determined metadata can describe a label, a comment, a constraint, a trigger, a name, a data type and/or a length of each column. At step 320, a statistical analysis is performed to determine corresponding statistical parameters (e.g., statistical parameters 134 and 144 of FIG. 1). By way of example, the determined statistical parameters may describe a minimum value, a maximum value, an average value and/or a range of values contained in each column. At step 330, ontological properties (e.g., ontological properties 136 and 146 of FIG. 1) are determined. The ontological properties describe a hierarchical structuring of knowledge about multiple elements by sub-characterizing the multiple elements according to their essential qualities. Accordingly the ontological properties may describe at least relevant and/or cognitive qualities of the multiple elements, which can be derived from a corresponding ontological tree structure having a plurality of nodes, each representing one of the multiple elements. An illustrative example of an ontological tree structure is described below with reference to FIG. 7. By way of example, the determined ontological properties may describe at least one synonym, at least one parent node and at least one ancestor node. At step 340, measurement units (e.g., measurement units 138 and 148 of FIG. 1) associated with each column are determined. Processing then continues according to method 200 of FIG. 2.

In one embodiment, the ontological properties and/or the measurement units are determined from metadata provided with the first and second database tables. An exemplary method for providing metadata defining measurement units or ontological properties is explained below with reference to FIG. 10-11. However, it should be noted that any implementation, known or unknown, for providing such measurement units and ontological structures is contemplated, such as providing the measurement units together with the content of each column.

Figure 4:
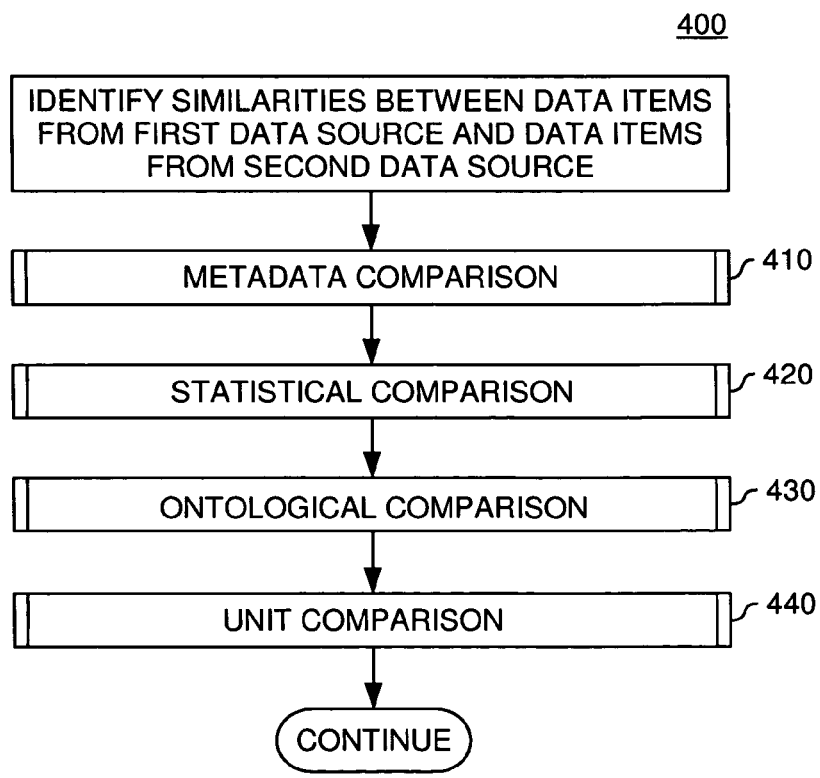
FIG. 4 is a flow chart illustrating identification of similarities between different data items in one embodiment.

Referring now to FIG. 4, one embodiment of a method 400 illustrating comparison of correlation attributes (e.g., correlation attributes 130 and 140 of FIG. 1) of different columns according to step 250 of FIG. 2 is shown. In one embodiment, the method 400 is performed for each column of a first database table with respect to each column of a second database table.

At step 410, a metadata comparison is performed using the metadata determined at step 310 of FIG. 3. More specifically, the metadata determined for each column of the first database table is compared with the metadata determined for each column of the second database table. By way of example, step 410 may consist in comparing the metadata 132 defining the correlation attributes 130 of FIG. 1 with the metadata 142 defining the correlation attributes 140 of FIG. 1. An exemplary method illustrating a metadata comparison in one embodiment is described below with reference to FIGS. 5A-B.

At step 420, a statistical comparison is performed using the statistical parameters determined at step 320 of FIG. 3. More specifically, the statistical parameters determined for each column of the first database table are compared with the statistical parameters determined for each column of the second database table. By way of example, step 420 may consist in comparing the statistical parameters 134 of the correlation attributes 130 with the statistical parameters 144 of the correlation attributes 140 of FIG. 1. An exemplary method illustrating a statistical comparison in one embodiment is described below with reference to FIGS. 6A-B.

At step 430, an ontological comparison is performed using the ontological properties determined at step 330 of FIG. 3. More specifically, the ontological properties determined for each column of the first database table are compared with the ontological properties determined for each column of the second database table. By way of example, step 430 may consist in comparing the ontological properties 136 of the correlation attributes 130 with the ontological properties 146 of the correlation attributes 140 of FIG. 1. An exemplary method illustrating an ontological comparison in one embodiment is described below with reference to FIGS. 7-8.

At step 440, a unit comparison is performed using the measurement units determined at step 340 of FIG. 3. More specifically, the measurement units determined for each column of the first database table are compared with the measurement units determined for each column of the second database table. By way of example, step 440 may consist in comparing the measurement units 138 of the correlation attributes 130 with the measurement units 148 of the correlation attributes 140 of FIG. 1. An exemplary method illustrating a unit comparison in one embodiment is described below with reference to FIG. 9. Processing then continues according to method 200 of FIG. 2.

It should be noted that FIG. 4 describes a specific embodiment where correlation attributes based on metadata, statistical parameters, ontological properties and measurement units are compared. However, alternative embodiments where only a part of these comparisons is performed are also contemplated. For instance, in one embodiment only metadata and statistical parameters are analyzed for identifying correlated columns. According to one aspect, a selection of comparisons to be performed can be user-specific or application-specific. Moreover, selection of comparisons to be performed may depend on available data. For instance, if an ontological tree structure is not provided, no ontological properties can be determined. In this case, only comparisons of correlation attributes based on one or more of metadata, statistical parameters and measurement units are performed.

As was noted above, exemplary embodiments of methods for comparing correlation attributes according to steps 410, 420, 430 and 440 of FIG. 4 are described below with reference to FIGS. 5-9. By way of illustration and for brevity, these exemplary methods are described with respect to a comparison of correlation attributes for a first and a second column, which can be included in one or more database tables. As was also noted above, a correlation value (e.g., correlation value 152 of FIG. 1) is associated with the first and second columns as an indicator of a degree of correlation of these two columns. In one embodiment, this correlation value is initially set to zero according to step 220 of FIG. 2. Then the correlation value is adjusted in the methods described below with reference to FIGS. 5-9 according to rules which are configured for intelligently determining a degree of correlation between the two columns. More specifically, these rules are adapted to increase, maintain or decreased the correlation value associated with the two columns according to whether the two columns are estimated to be potentially correlated to each other. In other words, when given correlation attributes of the two columns are estimated not to be similar, the correlation value associated with the two columns is maintained, i.e., the correlation value is not increased. However, when the given correlation attributes of the two columns are estimated to be similar, the correlation value associated with the two columns is increased. The correlation value can be increased by a predefined value, which may be user-specific or application-specific. For simplicity, only embodiments in which the correlation value is maintained or increased (but not decreased) are described.

Figure 5A:
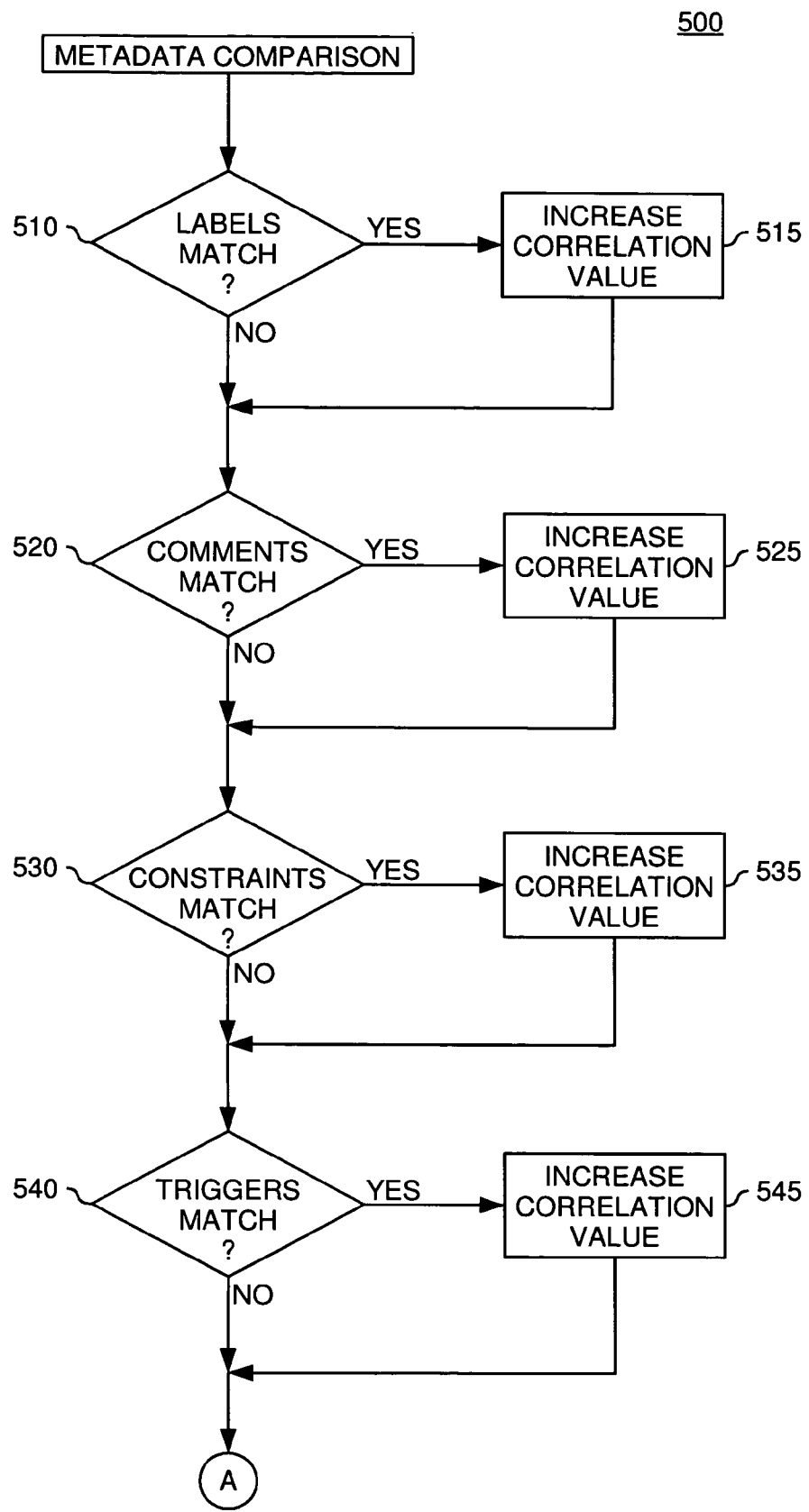
FIGS. 5A-B are flow charts illustrating a metadata comparison in one embodiment.
Figure 5B:
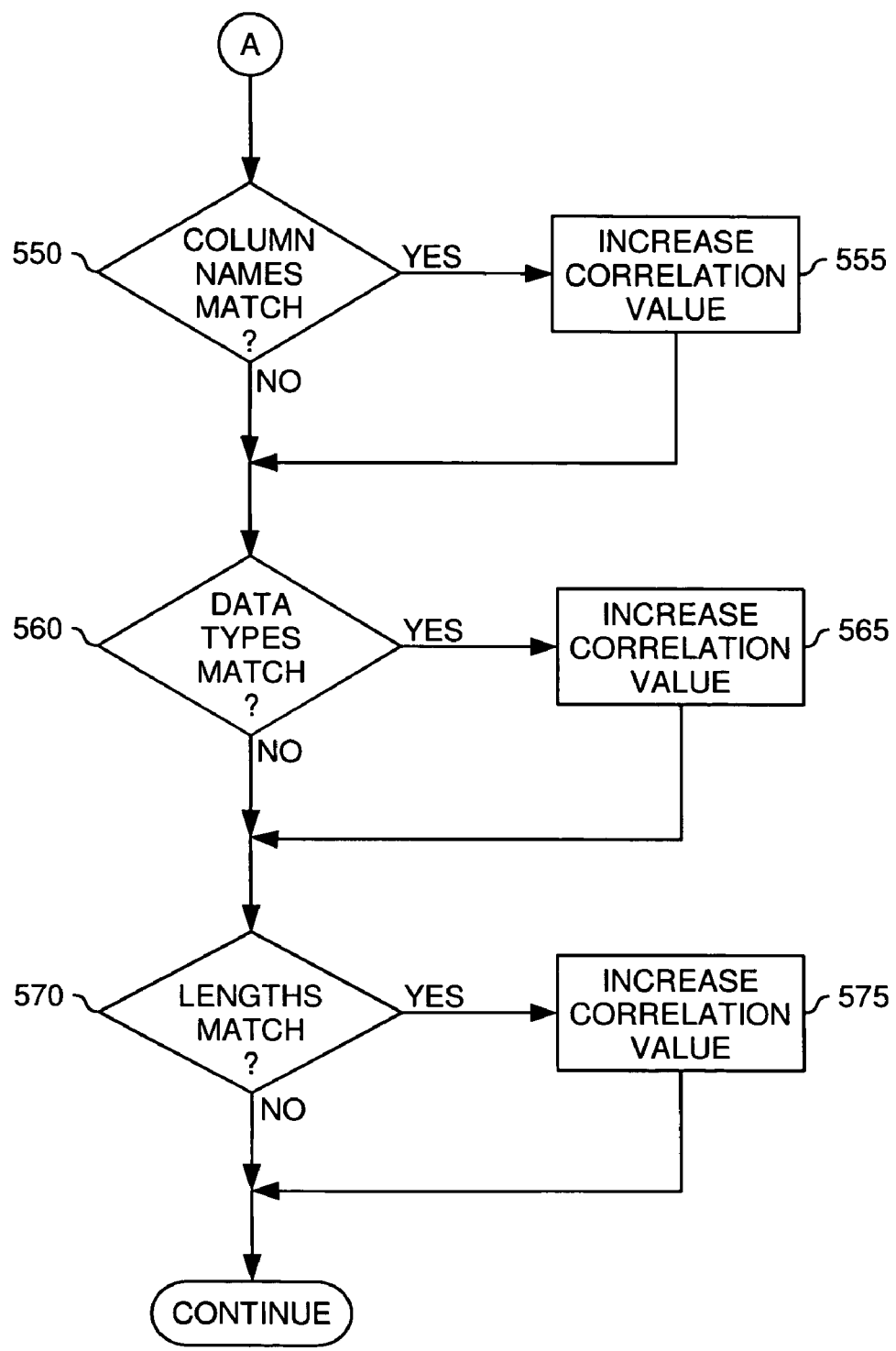

Referring now to FIGS. 5A-B, one embodiment of a method 500 illustrating a metadata comparison of metadata (e.g., metadata 132 and 142 of FIG. 1) according to step 410 of FIG. 4 is shown. At step 510, it is determined whether labels associated with each of the first and second columns match. If the labels do not match, processing continues at step 520. If, however, the labels match, it can be assumed that the two columns contain similar data. More specifically, if two different users attach similar labels to two different columns, it can be assumed that they intend to include similar data in these columns. For instance, an exemplary label for the first and second columns can be "Blood Pressure". Accordingly, it can be assumed that both columns contain data related to blood pressure measurements. Therefore, the correlation value associated with the two columns is increased at step 515. Processing then continues at step 520.

It should be noted that in each of these embodiments a "match" resulting in an increase in the correlation value does not necessarily require an exact match. Rather, some predefined degree of similarity may be sufficient to constitute a match. For example, a first label, "Blood Pressure" may be considered sufficiently similar to a second label, "BP". This is also true for each of the other metadata comparisons described below.

At step 520, it is determined whether comments associated with each of the first and second columns match. If the comments do not match, processing continues at step 530. If, however, the comments match, it can be assumed that the two columns contain similar data. More specifically, if two different users attach similar comments to two different columns, it can be assumed that they intend to include similar data in these columns. For instance, an exemplary comment for the first and second columns can be "Blood Pressure Measurements". Accordingly, it can be assumed that both columns contain data related to blood pressure measurements. Therefore, the correlation value associated with the two columns is increased at step 525. Processing then continues at step 530.

At step 530, it is determined whether constraints associated with each of the first and second columns, such as referential constraints or check constraints, match. If the constraints do not match, processing continues at step 540. If, however, the constraints match, it can be assumed that the two columns contain similar data. More specifically, a constraint is generally defined to restrict data in a column. Thus, if two constraints associated with two different columns match, it can be assumed that these constraints are defined to restrict similar data in both columns. Therefore, the correlation value associated with the two columns is increased at step 535. Processing then continues at step 540.

At step 540, it is determined whether triggers associated with each of the first and second columns match. If the triggers do not match, processing continues at step 550. If, however, the triggers match, it can be assumed that the two columns contain similar data. More specifically, triggers are generally defined over a column to monitor the data in the column. Thus, if two triggers associated with two different columns match, it can be assumed that these triggers are defined to monitor similar data in both columns. Therefore, the correlation value associated with the two columns is increased at step 545. Processing then continues at step 550.

At step 550, it is determined whether the column names of each of the first and second columns match. If the column names do not match, processing continues at step 560. If, however, the column names match, it can be assumed that the two columns contain similar data. More specifically, if two different users designate two different columns with matching column names, it can be assumed that they intend to include similar data in these columns. For instance, an exemplary column name for the first and second columns can be "BPV" as an abbreviation for "Blood Pressure Values". Accordingly, it can be assumed that both columns contain values related to blood pressure measurements. Therefore, the correlation value associated with the two columns is increased at step 555. Processing then continues at step 560.

At step 560, it is determined whether data types associated with each of the first and second columns match. For instance, it can be determined whether identical character code sets are used in both columns. If the data types do not match, processing continues at step 570. If, however, the data types match, it can be assumed that the two columns contain similar data. For instance, if both columns use a LONG VARCHAR character code set, it can for instance be assumed that both columns contain some descriptive text, such as a general description or general comments. Therefore, the correlation value associated with the two columns is increased at step 565. Processing then continues at step 570.

At step 570, it is determined whether corresponding lengths of character strings in each of the first and second columns match. A length of a given character string can, for instance, be determined by counting a number of characters contained in the character string. If the lengths do not match, processing continues according to method 400 of FIG. 4. If, however, the lengths match, it is assumed that the two columns contain similar data. Therefore, the correlation value associated with the two columns is increased at step 575. Processing then continues according to method 400 of FIG. 4.

It should be noted that the metadata described with respect to FIG. 5 are merely illustrative. Other metadata can be determined and used to adjust the correlation value associated with the two columns. Thus, extension to such other metadata is broadly contemplated. Further, a given comparison need not include each of the metadata types described in FIG. 5. For example, and one embodiment, only labels and comments are correlated.

Figure 6A:
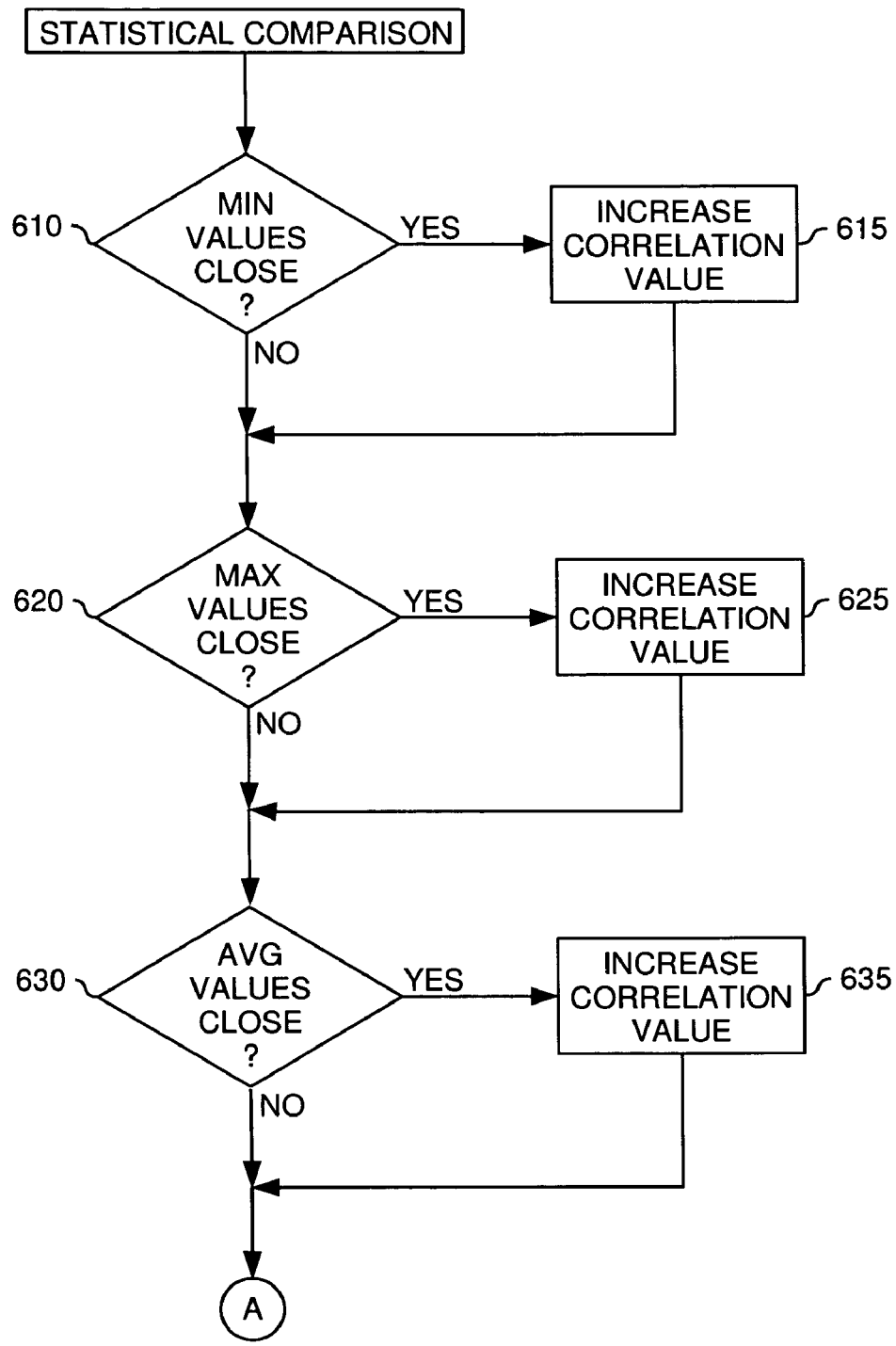
FIGS. 6A-B are flow charts illustrating a statistical comparison in one embodiment.
Figure 6B:
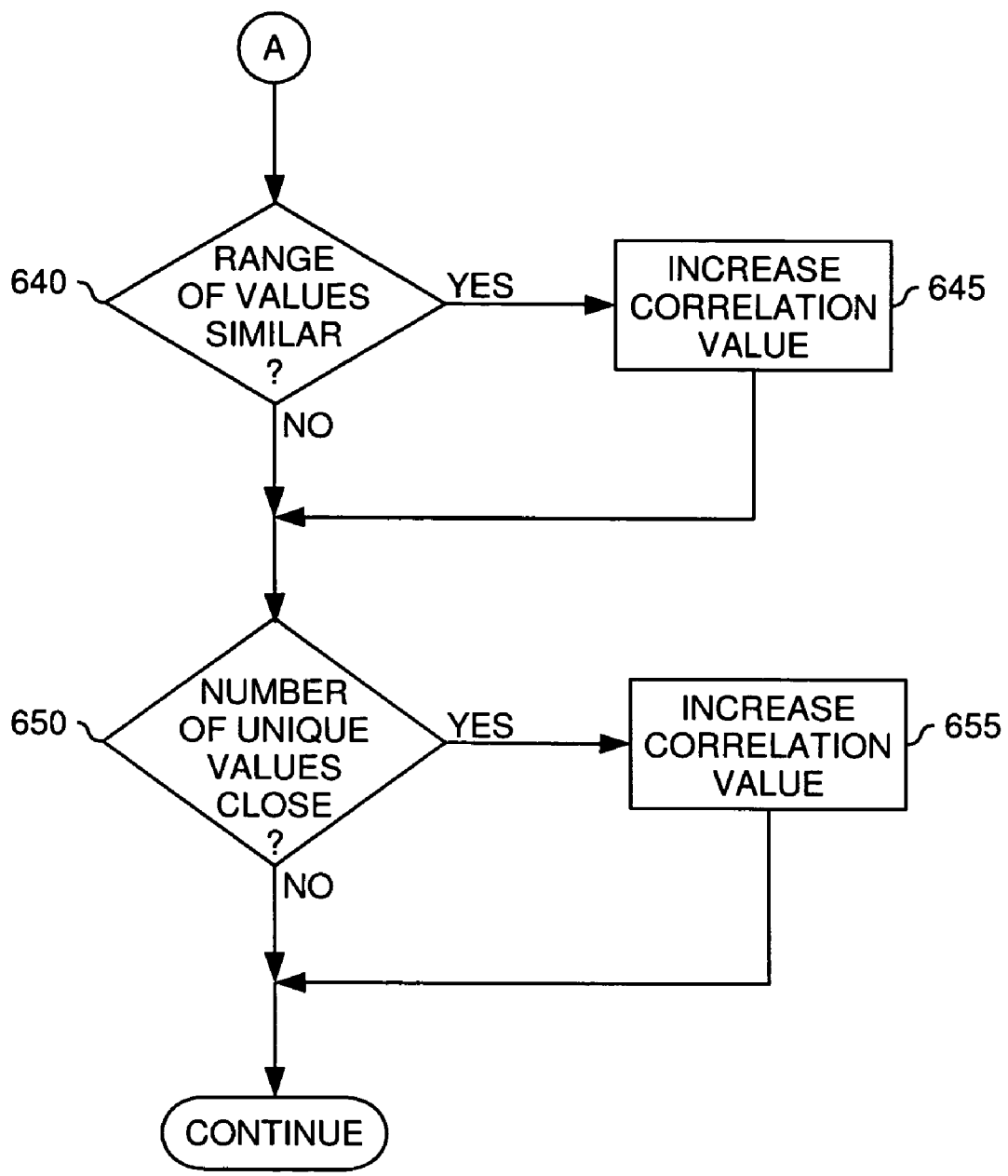
Figure 7:
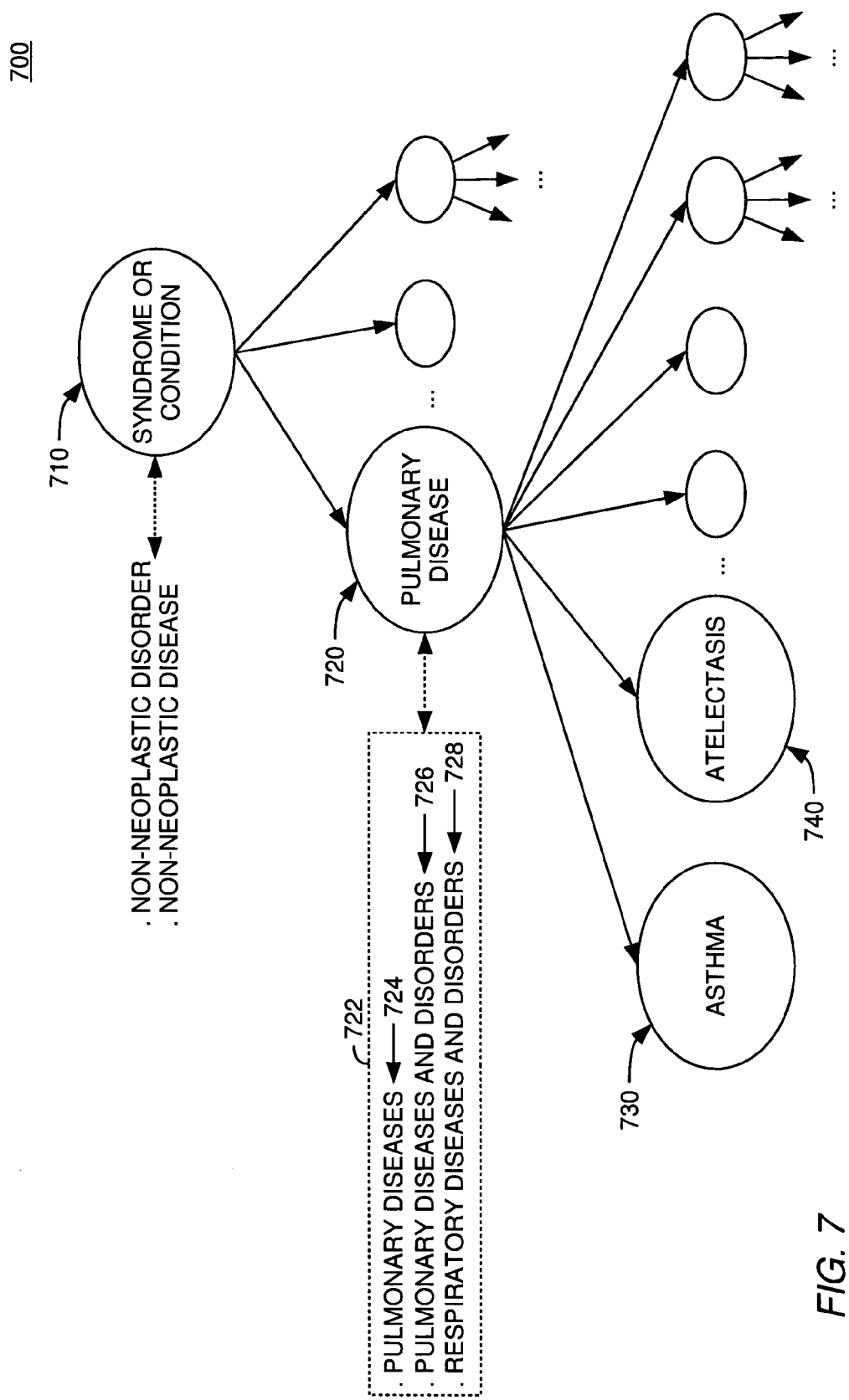
FIG. 7 is a relational view illustrating an ontological tree structure in one embodiment.

Referring now to FIGS. 6A-B, one embodiment of a method 600 illustrating a statistical comparison of statistical parameters (e.g., statistical parameters 134 and 144 of FIG. 1) according to step 420 of FIG. 4 is shown. In one embodiment, the method 600 is performed to further adjust the correlation value(s) returned from method 500 of FIGS. 5A-B.

At step 610, it is determined whether minimum values calculated for all values of each of the first and second columns are sufficiently close to each other. Determining whether the minimum values are sufficiently close may include determining whether the difference of the two minimum values is below a predefined threshold or, alternatively, match exactly. If the minimum values are not sufficiently close, processing continues at step 620. If, however, the minimum values are sufficiently close, it is assumed that the two columns may contain similar data. Therefore, the correlation value associated with the two columns is increased at step 615. Processing then continues at step 620.

At step 620, it is determined whether maximum values calculated for all values of each of the first and second columns are sufficiently close to each other. Determining whether the maximum values are sufficiently close may include determining whether the difference of the two maximum values is below a predefined threshold or, alternatively, match exactly. If the maximum values are not sufficiently close, processing continues at step 630. If, however, the maximum values are sufficiently close, it is assumed that the two columns may contain similar data. Therefore, the correlation value associated with the two columns is increased at step 625. Processing then continues at step 630.

At step 630, it is determined whether average values calculated for all values of each of the first and second columns are sufficiently close to each other. Determining whether the average values are close may include determining whether the difference of the two average values is below a predefined threshold or, alternatively, match exactly. If the average values are not sufficiently close, processing continues at step 640. If, however, the average values are sufficiently close, it is assumed that the two columns may contain similar data. Therefore, the correlation value associated with the two columns is increased at step 635. Processing then continues at step 640.

At step 640, it is determined whether ranges of values contained in each of the first and second columns are sufficiently similar. Determining whether the ranges of values are sufficiently similar may include determining whether the difference of the two ranges of values is below a predefined threshold or, alternatively, match exactly. If the ranges of values are not sufficiently similar, processing continues at step 650. If, however, the ranges of values are sufficiently similar, it is assumed that the two columns may contain similar data. Therefore, the correlation value associated with the two columns is increased at step 645. Processing then continues at step 650.

At step 650, it is determined whether numbers of unique values contained in each of the first and second columns are sufficiently similar. Determining whether the numbers of unique values are similar may include determining whether the difference of the two numbers of unique values is below a predefined threshold or, alternatively, match exactly. If the numbers of unique values are not sufficiently similar, processing continues according to method 400 of FIG. 4. If, however, the numbers of unique values are sufficiently similar, it is assumed that the two columns may contain similar data. Therefore, the correlation value associated with the two columns is increased at step 655. Processing then continues according to method 400 of FIG. 4.

It should be noted that the statistics described with respect to FIG. 6 are merely illustrative. Other statistics can be determined and used to adjust the correlation value associated with the two columns. Thus, extension to such other statistics is broadly contemplated. Further, a given comparison need not include each of the statistics described in FIG. 6. For example, and one embodiment, only minimum values and maximum values are correlated.

As was noted above, one embodiment includes performing an ontological comparison of ontological properties (e.g., ontological properties 136 and 146 of FIG. 1) according to step 430 of FIG. 4 is shown. As was also noted above, the ontological properties can be determined from an ontological tree structure. An exemplary ontological tree structure 700 is explained below with reference to FIG. 7. The exemplary ontological tree structure 700 illustrates a hierarchical structure having a plurality of nodes 710, 720, 730 and 740. By way of example, the ontological tree structure 700 illustrates a categorization of a plurality of related diseases which all define a syndrome or condition represented by node 710 "SYNDROME OR DISEASE". In other words, the ontological tree structure 700 represents a concept of ordering the plurality of related diseases.

Illustratively, the "SYNDROME OR DISEASE" node 710 defines a parent node for all other nodes illustrated immediately below, such as node 720 "PULMONARY DISEASE". The "PULMONARY DISEASE" node 720 includes an exemplary list 722 of synonyms. The list 722 defines synonyms for the term "PULMONARY DISEASE". Exemplary synonyms are: (i) "PULMONARY DISEASES" (referred to as 724), (ii) "PULMONARY DISEASES AND DISORDERS" (referred to as 726), and (iii) "RESPIRATORY DISEASES AND DISORDERS" (referred to as 728). Providing the synonyms 724, 726 and 728 in the list 722 indicates that they can be used interchangeably with the term "PULMONARY DISEASE" describing node 720. Furthermore, it should be noted that node 720 defines a parent node for nodes 730 and 740. Therefore, the nodes 730 and 740 represent so-called "siblings" or "sibling nodes". The node 730 is designated as "ASTHMA" and the node 740 is designated as "ATELECTASIS".

The ontological tree structure 700 further defines a plurality of ancestor relationships, for instance, between nodes 710 and 730. More specifically, as node 710 is the parent node of node 720, which is the parent node of node 730, node 710 represents an ancestor of node 730.

According to one aspect, an ontological tree structure such as the ontological tree structure 700 can be used for identifying similarities between different columns. For instance, columns and content of the columns can be analyzed with respect to the ontological tree structure in order to determine whether two or more columns are based on a concept which is identical or similar to a concept described by the ontological tree structure. Therefore, the two or more columns are compared with ontological properties determined from the ontological tree structure, as described in more detail in the following with reference to FIG. 8.

Figure 8:
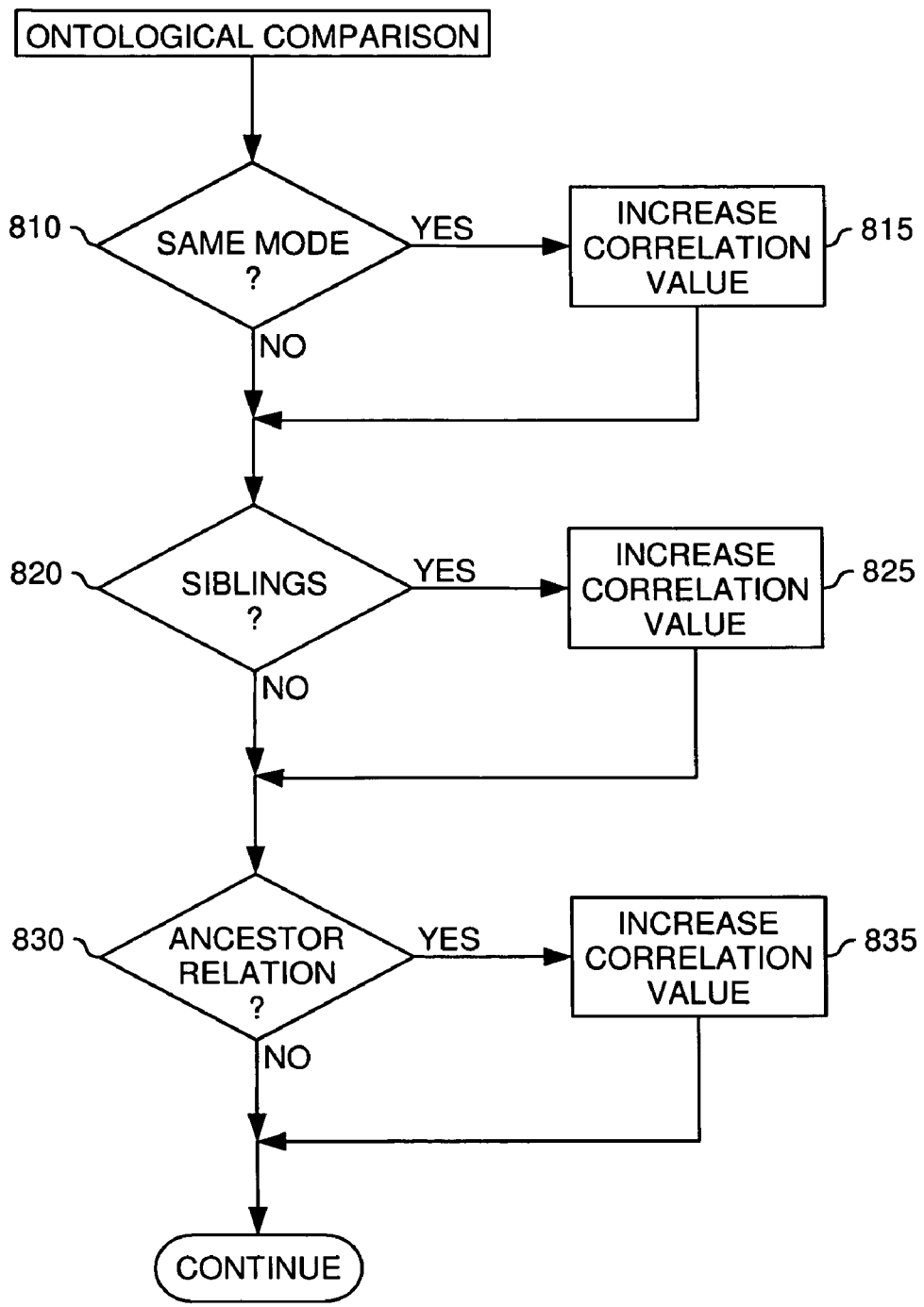
FIG. 8 is a flow chart illustrating an ontological comparison in one embodiment.

Referring now to FIG. 8, one embodiment of a method 800 illustrating an ontological comparison of ontological properties (e.g., ontological properties 136 and 146 of FIG. 1) according to step 430 of FIG. 4 is shown. In particular, FIG. 8 shows, one embodiment of further adjusting the correlation value(s) returned from method 600 of FIG. 6. At step 810, based on the ontological properties it is determined whether the first and the second column are represented by the same node (e.g., node 720 in FIG. 7) in an ontological tree structure (e.g., ontological tree structure 700 of FIG. 7). Determining whether the first and the second column are represented by the same node may include determining whether the first and second columns are defined according to a list of synonyms associated with a given node (e.g., list 722 of FIG. 7). If the first and the second column are not represented by the same node, processing continues at step 820. If, however, the first and second columns are represented by the same node, it can be assumed that they are related to identical subject matter. Accordingly, it is assumed that the first and second columns contain similar data and, consequently, that the first and second columns are correlated. Therefore, the correlation value is increased at step 815. Processing then continues at step 820.

At step 820, it is determined whether the first and the second column are represented by siblings (e.g., nodes 730 and 740 in FIG. 7) in the ontological tree structure. If the first and the second column are not represented by siblings, processing continues at step 830. If, however, the first and second columns are represented by siblings, it can be assumed that they are related to identical subject matter. Accordingly, it is assumed that the first and second columns contain similar data and, consequently, that the first and second columns are correlated. Therefore, the correlation value is increased at step 825. Processing then continues at step 830.

At step 830, it is determined whether the first and the second column are represented by an ancestral relationship (e.g., nodes 710 and 730 in FIG. 7) in the ontological tree structure. More specifically, it is determined whether a node representing the first column represents an ancestor for a node representing the second column or vice versa. If the first and the second column do not have an ancestral relationship, processing continues according to method 400 of FIG. 4. If, however, the first and second columns have an ancestral relationship, they can be related to identical subject matter. Accordingly, it is assumed that the first and second columns contain similar data and, consequently, that the first and second columns are correlated. Therefore, the correlation value is increased at step 835. Processing then continues according to method 400 of FIG. 4.

Figure 9:
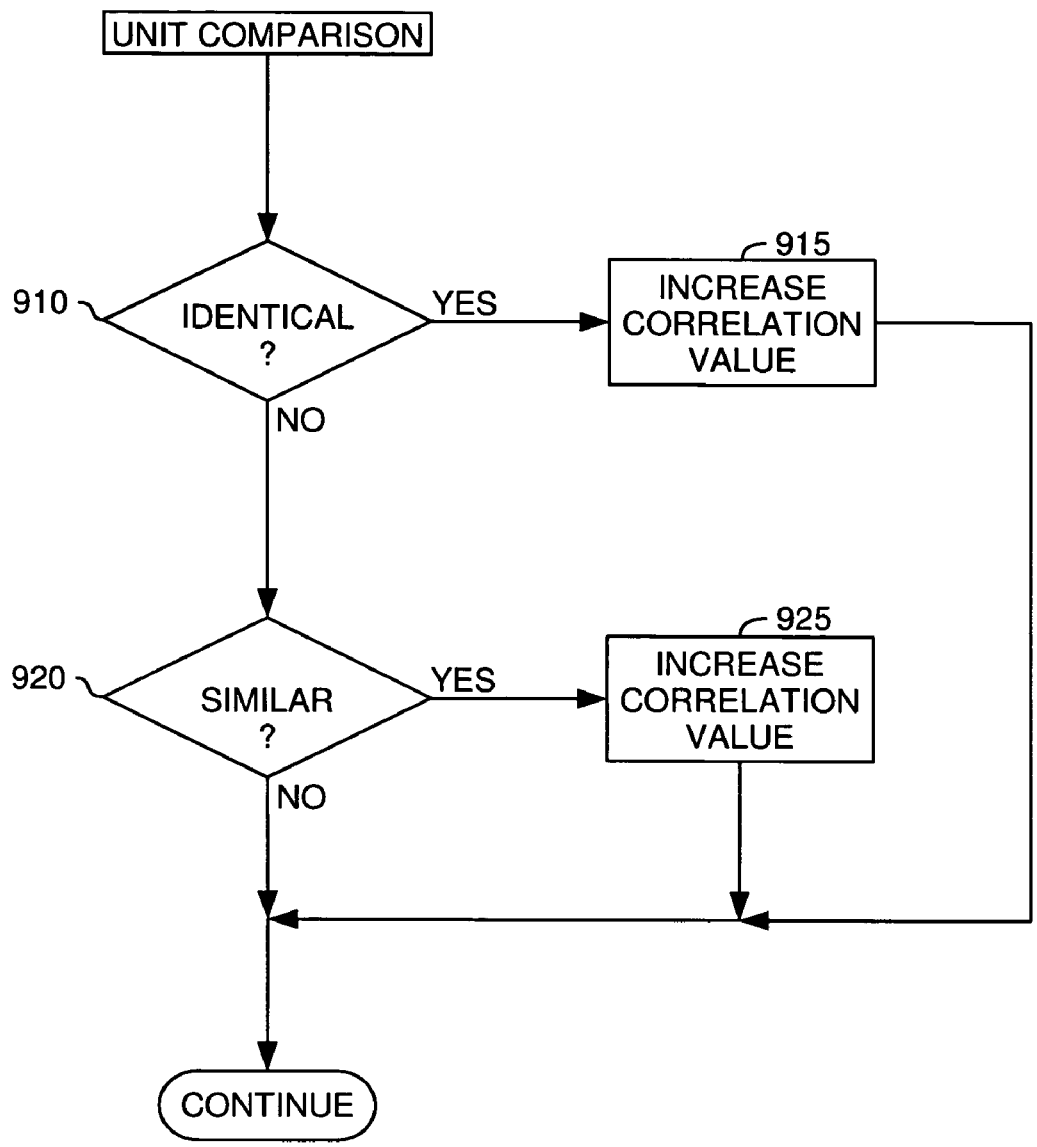
FIG. 9 is a flow chart illustrating a unit comparison in one embodiment.

Referring now to FIG. 9, one embodiment of a method 900 illustrating a unit comparison of measurement units (e.g., measurement units 138 and 148 of FIG. 1) according to step 440 of FIG. 4 is shown. In one embodiment, the method 900 is performed to further adjust the correlation value(s) returned from method 800 of FIG. 8.

At step 910, it is determined whether measurement units associated with each of the first and second columns are the same. In this context, "the same" need not mean identical since a given unit of measurement may not be represented in the identical way for the first and second columns. For example, the units label for the first column may be "kilograms" while the units label for the second column may be "kg". Nevertheless, these labels may be recognized as being interchangeable, and therefore correlated. If the measurement units are not same (e.g., the measurement units for the first column is "kilograms" and the measurement units for the second column is "pounds"), processing continues at step 920. If, however, the measurements units are the same, this indicates that the two columns contain similar data. Therefore, the correlation value associated with the two columns is increased at step 915. Processing then continues according to method 400 of FIG. 4.

At step 920, it is determined whether the measurement units associated with each of the first and second columns are equivalents, that is, mathematically convertible. In one embodiment, this determination is performed using a table of equivalencies that indicates groups of equivalent measurement units. An exemplary table of equivalencies is shown in Table I below. Illustratively, each measurement unit in the exemplary table of equivalencies is provided with a fully spelled-out definition (in the Unit column) and a corresponding abbreviation (in the Abbreviation column). However, it should be noted that the table of equivalencies can be provided such that it includes only one of the full definition and the abbreviation for each measurement unit.

TABLE I

EXAMPLARY TABLE OF EQUIVALENCIES

| 001 | Group | Unit | Abbreviation |
|---|---|---|---|
| 002 | 1 | ton | t |
| 003 | 1 | kilogram | kg |
| 004 | 1 | pound | lb |
| 005 | 1 | ounce | oz |
| 006 | 1 | grain | grain |
| 007 | 2 | gallon | gal |
| 008 | 2 | liter | l |
| 009 | 2 | cubic decimeter | dm$^3$ |
| 010 | 3 | kilometer | km |
| 011 | 3 | meter | m |
| 012 | 3 | centimeter | cm |
| 013 | 3 | mile | mi |
| 014 | 3 | feet | ft |
| 015 | 3 | inch | in |
| 016 | : | : | : |
| 017 | : | : | : |

Illustratively, the exemplary table of equivalencies shown in Table I includes three groups of equivalent measurement units: (i) a first group related to mass and weight measurement units (lines 002-006), a second group related to fluid capacity measurement units (lines 007-009), and a third group related to length measurement units (010-015). Lines 016-017 indicate that additional groups can be provided such as, for example, groups related to area or volume measurement units. By way of example, the first group (lines 002-006) indicates that the measurement units "ton" (line 002), "kilogram" (line 00), "pound" (line 004), "ounce" (line 005) and "grain" (line 006) are equivalent, as all these measurement units relate to masses and weights. Accordingly, weight values given in one of these measurement units can be converted to weight values in any other of these measurement units using an appropriate conversion factor. A conversion factor of 2.2, for instance, may be used to convert a weight value given in "kilograms" into "pounds". A plurality of such conversion factors can be combined in a conversion table indicating a plurality of possible conversions between different measurement units. An exemplary conversion table is shown in Table II below.

TABLE II

EXAMPLARY CONVERSION TABLE

| 001 | Unit 1 | Unit 2 | Conversion factor |
|---|---|---|---|
| 002 | kg | t | 0.0010 |
| 003 | kg | lb | 2.2046 |
| 004 | kg | oz | 35.2740 |
| 005 | kg | grain | 15432.3584 |
| 006 | : | : | : |
| 007 | : | : | : |

Illustratively, the exemplary conversion table of Table II illustrates only conversion definitions for converting weights from "kg" to other measurement units. However, lines 006-007 indicate that any other conversion definitions can be included in such a conversion table, such as conversion definitions for converting lengths or liquid capacity measurement units. By way of example, line 003 of Table II includes a conversion definitions which allows to convert a weight value given in "kilogram" into a value given in "pounds" by multiplying the weight value with a conversion factor of "2.2046", i.e., 1 kg=2.2046 lbs. In other words, a weight value of "32" given in "kilogram" can be converted into a weight value given, e.g., in "pounds" by multiplying the value "32" with the factor "2.2046". Accordingly, 32 kg=(32×2.2046) lbs=70.5472 lbs.

Accordingly, if it is determined at step 920 that the measurement units are not similar, processing continues according to method 400 of FIG. 4. If, however, the measurements units are similar, this indicates that the two columns may contain similar data. For instance, an exemplary measurement unit associated with the first column can be "kg" and an exemplary measurement unit associated with the second column can be "lbs". According to Table I above, these measurement units are equivalent as they are both in group "1" (lines 003-004). In other words, values included in the first column can be converted to "lbs" and values included in the second column can be converted to "kgs" using the conversion definition of line 003 of Table II and are, thus, equivalents. Therefore, the correlation value associated with the two columns is increased at step 925. Processing then continues according to method 400 of FIG. 4.

Accordingly, the measurement units of different columns can be compared for identifying correlated columns. In one embodiment, it is contemplated that the measurement units are included as part of the table data, e.g., the units may be included in each field of a weight column. According to another embodiment the measurement units can be provided as metadata for respective columns of a database table. Creation of units metadata and application of units metadata in different embodiments is described in more detail below with reference to FIGS. 10-14.

Figure 10:
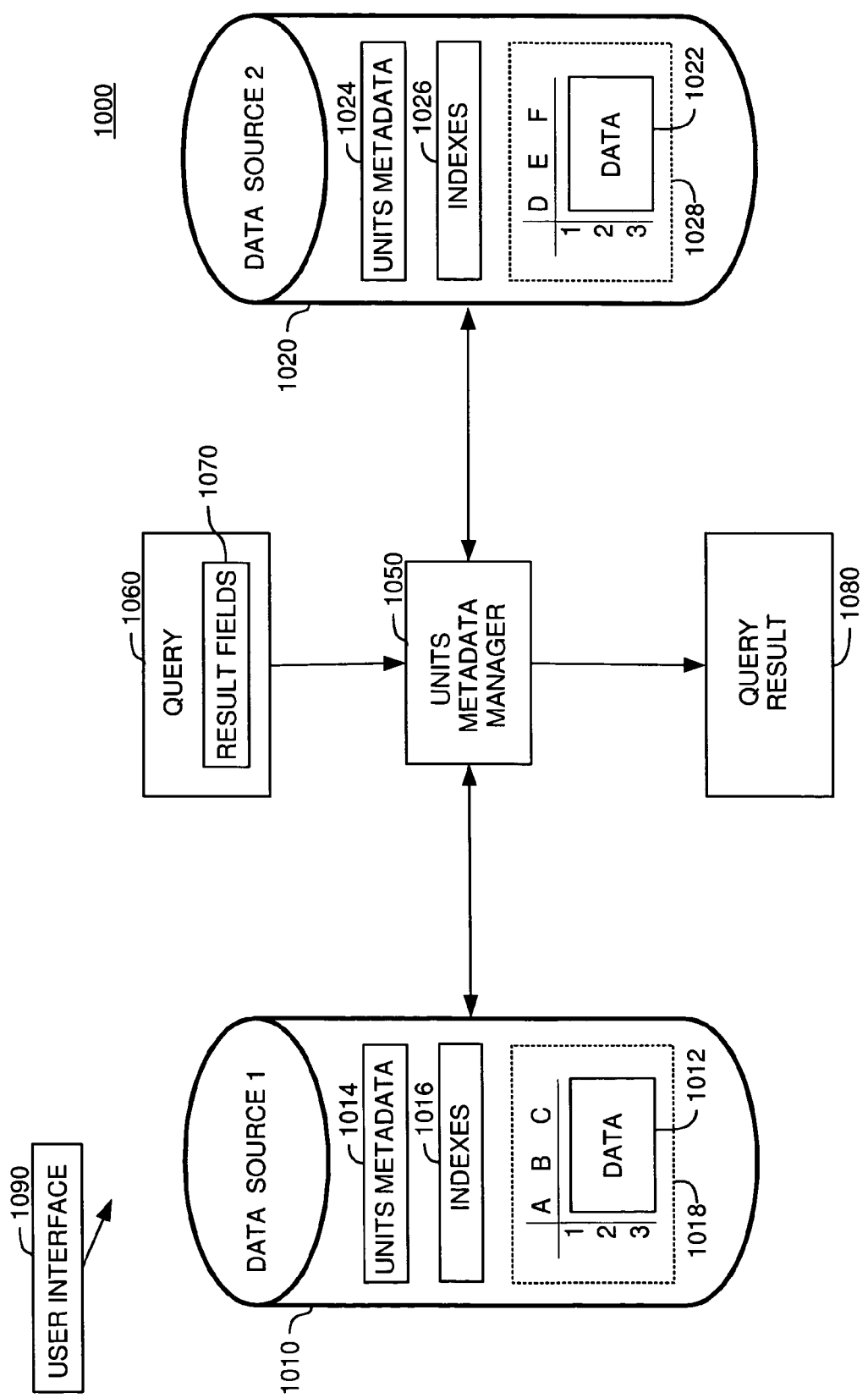
FIG. 10 is a relational view of components implementing another aspect of the invention.

Referring now to FIG. 10, a relational view of components implementing one aspect of the invention is illustrated. The components illustratively include a user interface 1090, a units metadata manager 1050 and two data sources, i.e., a first data source 1010 "DATA SOURCE 1" (e.g., data source 110 of FIG. 1) and a second data source 1020 "DATA SOURCE 2" (e.g., data source 120 of FIG. 1). The user interface 1090 is configured for allowing user interaction with the units metadata manager 1050 and the two data sources 1010 and 1020. For instance, the user interface 1090 can be used for entering data, such as data 1012 and 1022 and/or metadata, into the data sources 1010 and 1020. The user interface 1090 may further be used for entering queries to be executed against the data sources 1010 and 1020. The units metadata manager 1050 is configured for creating and processing units metadata. The data sources 1010 and 1020 are representative of any collection of data regardless of the particular physical representation. By way of illustration, the data sources 1010 and 1020 may be databases organized according to a relational schema (accessible by SQL queries) or according to an XML schema (accessible by XML queries). However, the invention is not limited to a particular physical representation or schema of the data sources 1010 and 1020, and contemplates extension to schemas presently unknown.

Illustratively, the data source 1010 includes data 1012 and the data source 1020 includes data 1022. According to one aspect, each of the data 1012 and 1022 is presented in a tabular form having a plurality of columns and rows, as illustrated by tables 1018 and 1028, respectively. The plurality of columns and rows is arranged in one or more tables. The data 1012 is associated with units metadata 1014. Furthermore, for one or more of the columns arranged in the table(s) defining the data 1012, corresponding indexes 1016, such as bitmap indexes or encoded vector indexes (EVI) are provided. Similarly, the data 1022 is associated with units metadata 1024 and for one or more of the columns arranged in the table(s) defining the data 1022, corresponding indexes 1026 are provided.

In one embodiment, the units metadata manager 1050 receives data to be stored in a given column of one of the table(s) from the first and second data sources 1010 and 1020. Upon receipt of the data, the units metadata manager 1050 determines whether the data includes associated measurement units. If the data includes associated measurement units, the units metadata manager 1050 stores the measurement units as units metadata 1014 or 1024. An exemplary embodiment of an operation of the units metadata manager 1050 for creating units-metadata is described below with reference to FIG. 11.

Furthermore, the units metadata manager 1050 is configured for further processing the units metadata 1014 and 1024 for query execution. Accordingly, in one embodiment the units metadata manager 1050 receives queries against the data 1012 and/or 1022 and generates a corresponding query result 1080. A given query may contain one or more result fields 1070 specifying columns in the table(s) defining the data 1012 and/or 1022 to be returned. In one embodiment, the given query is a SQL query that specifies columns in a JOIN statement or a WHERE clause, where the columns have associated units metadata. Furthermore, the given query may be constructed for searching data in a specific measurement unit, such as "kg" in the table(s) defining the data 1012 and 1022, where the corresponding data is stored in another, equivalent measurement unit, such as "lb". Alternatively, the given query may simply request the data to be returned in a specific measurement unit, without specifying a measurement unit in the search conditions. For instance, the given query may request all data related to masses and weights and may specify that the requested data be returned in "kg". To this end, the units metadata manager 1050 is configured for processing the query in order to guarantee determination of a desired query result. Exemplary embodiments of operations of the units metadata manager 1050 for processing queries are described below with reference to FIGS. 12-14.

Figure 11:
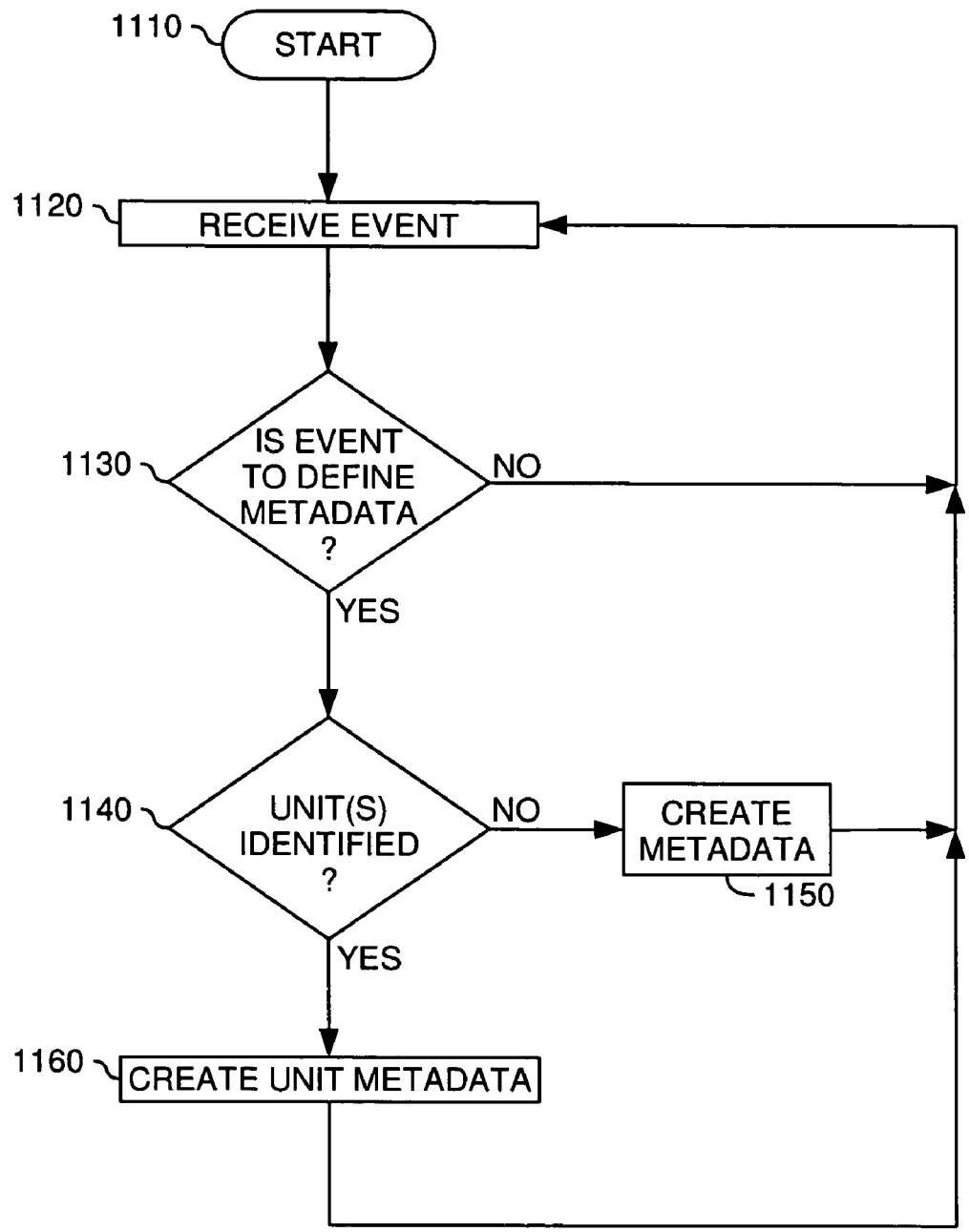
FIG. 11 is a flow chart illustrating creation of unit metadata in one embodiment.

Referring now to FIG. 11, one embodiment of a method 1100 for creating units metadata for a column of a database table is shown. In other words, method 1100 is configured for creating a specific type of metadata suitable for representing measurement units, and which is referred to herein as "units metadata".

As was noted above, metadata is structured descriptive information about a resource. In other words, metadata is data about other data. For example, metadata can be information that describes a name of a database table or a location of a document in a database, but it is not the actual data in the table or document. Generally, the metadata is hidden from users during normal operations on the actual data. Metadata about resources can be defined as an extension to SQL Data Definition Language (DDL). DDL is used to define data and its relationship to other data and is suitable to create data schema or record structures for inclusion in data stores or files. In other words, the DDL defines the physical structure of the database table such as the table name, column names and data types for each column. Creation of the physical structure of the database table using DDL can be accomplished using SQL statements such as CREATE TABLE or CREATE INDEX. For instance, the CREATE TABLE statement is used to define the physical structure of the database table. The definition must include the table name and the names and attributes of its columns. The definition may include other attributes of the table such as a primary key. The metadata for the database table can be created as an extension to the DDL for the database table using SQL statements such as LABEL ON or COMMENT ON. By way of example, the COMMENT ON statement can be used to add or replace comments in a catalog description of the database table, views, aliases, user-defined types, functions, packages, parameters, procedures, indexes, or columns of the database table. The metadata can then be stored together with or separately from the database table or, more generally, from corresponding resources. For instance, metadata on internet resources can be stored together with the internet resources. In this case, the metadata can be placed on top of a resource document, such as an HTML document. Normally, the metadata can be found inside a header section of the HTML document, where it is in general hidden to the user. Metadata stored separately from a resource can be located in a database, in an index or in a catalogue. In this case, the metadata is stored as a persistent object in the database. Furthermore, users can add or modify the metadata in the database. In the following, reference is made by way of example to metadata which is stored as a persistent object (e.g., units metadata 1014 or 1024 of FIG. 10) separately from a corresponding resource (e.g., data 1012 or 1022 of FIG. 10) in a database. However, it should be noted that the invention is not limited to metadata which is stored separately from a corresponding resource and that, instead, extension to other implementations of metadata generation and storage, known or unknown, is contemplated.

Method 1100 starts at step 1110. At step 1120, an event is detected. More specifically, in one embodiment an event with respect to a column of a database table is detected at step 1120. The event can be any process performed with respect to the column, such as starting, interrupting or ending an operation on the data of the column. For instance, a user may be entering data and metadata for the column. In one embodiment, the event is receipt of a specific statement requesting creation of units metadata.

At step 1130, it is determined whether the event is a request to create metadata. If the event is not a request for creating metadata, processing returns to step 1120 and waits until detection of a subsequent event. If, however, the event is a request for creating metadata, it is determined at step 1140 whether the request is for measurement units metadata. If not, it is assumed that conventional metadata is to be created. Accordingly, at step 1150 corresponding metadata is created. Processing then returns to step 1120 and waits until detection of a subsequent event. If, however, it is determined at step 1140 that the metadata to be created is units metadata, a data object containing the measurement units is created. For instance, a specific statement such as "UNIT ON WEIGHT IS 'kg'" can be received. Illustratively, the specific statement has a syntax similar to the SQL LABEL ON statement. Specifically, the statement is configured as a "UNIT ON" statement that indicates that "kg" is to be stored as units metadata for a "WEIGHT" column of the database table. According to one aspect, the UNIT ON statement can be used as an extension to available SQL statements for creating units metadata. According to the UNIT ON statement, a data object containing the measurement unit "kg" is created as units metadata for the database table. In one embodiment, this data object is persistently stored as units metadata (e.g., units metadata 1014 or 1024 of FIG. 10) in a corresponding data source (e.g., data source 1010 or 1020 of FIG. 10). The corresponding data source includes the database table having the column, for which the units metadata has been created. Creation and storage of metadata is well-known in the art and is, therefore, not explained in more detail.

In one embodiment, the units metadata may further specify that values which are stored in the column of the database table are to be rounded according to a predefined rounding factor to reduce required storage capacity. The predefined rounding factor can be set using a particular statement such as "ROUNDING WEIGHT TO #2". Illustratively, the particular statement is also shown having a syntax similar to the SQL LABEL ON statement. By way of example, the particular statement is configured as a "ROUNDING" statement that indicates that values stored in the "WEIGHT" column of the database table should be rounded to two decimal places ("#2"). According to one aspect, the particular ROUNDING statement can also be used as an extension to available SQL statements when creating units metadata.

In one embodiment, the units metadata created according to method 1100 can be used in particular operations on data (e.g., data 112 or 122 of FIG. 1, or data 1012 or 1022 of FIG. 10) of one or more data sources (e.g., data source 110 or 120 of FIG. 1, or data source 1010 or 1020 of FIG. 10). As was noted above, the units metadata can be used in execution of queries against the data source(s). Exemplary embodiments of application of units metadata in query execution are described below with reference to FIGS. 12-14.

Figure 12:
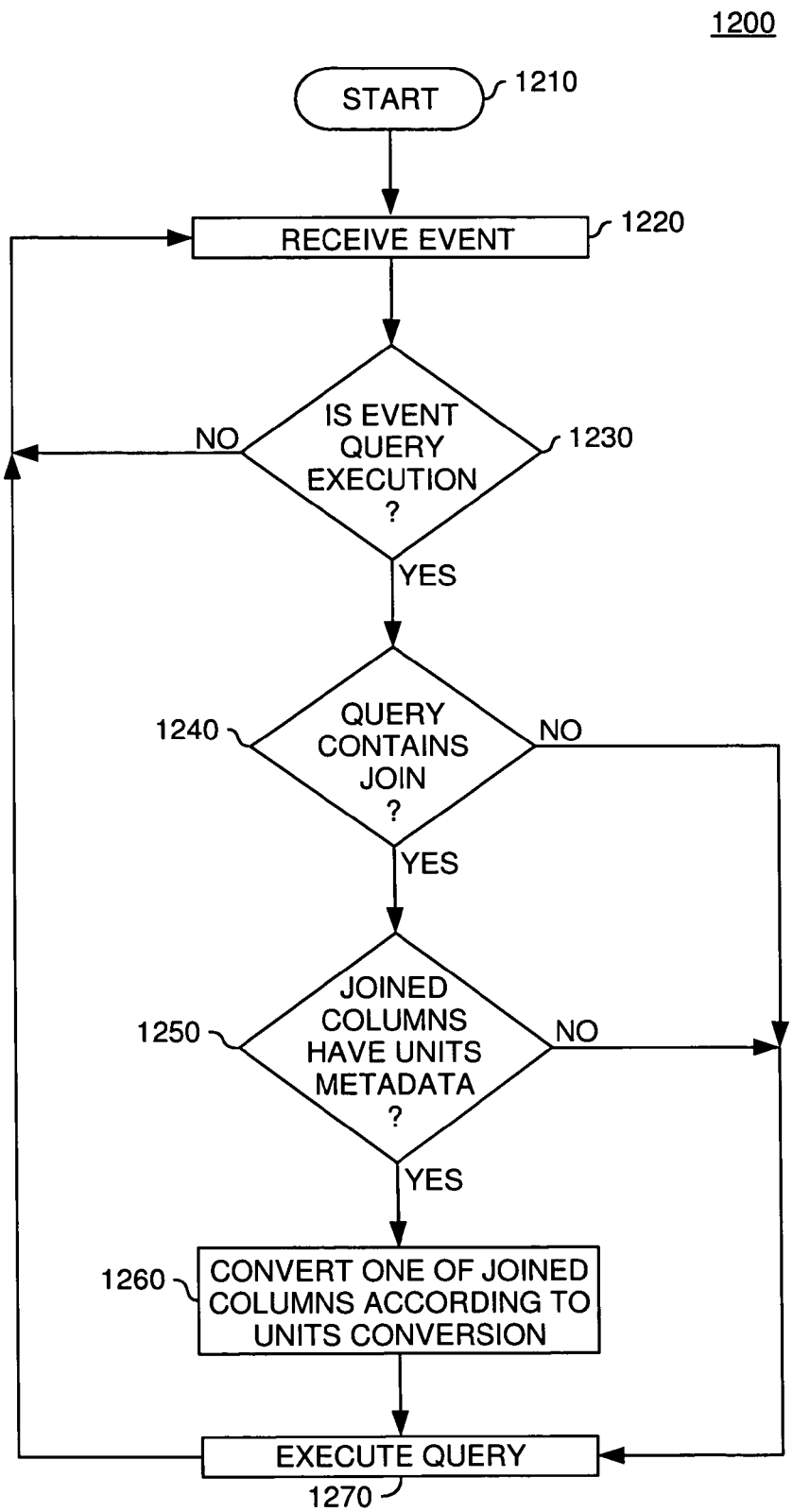
FIG. 12 is a flow chart illustrating query execution using unit conversion in one embodiment.

Referring now to FIG. 12, one embodiment of a method 1200 for using units metadata (e.g., units metadata 1014 or 1024 of FIG. 10) in execution of a query (e.g., query 1060 of FIG. 10) having a JOIN statement is shown. In one embodiment, the query to be executed against the database(s) is an SQL query. An exemplary SQL query is shown in Table III below. The exemplary SQL query of Table III is executed on a table including data on patients having an allergy "A" and a table including data on patients having an allergy "B". The exemplary SQL query is intended to determine information about all patients having a height of less than "5 ft" (i.e., 5 feet) and who suffer from one of the allergies "A" and "B".

TABLE III

EXEMPLARY SQL QUERY

001  SELECT *
002  FROM Allergy_A_Patients INNER JOIN Allergy_B_Patients
003    ON (Allergy_A_Patients.Weight=
      Allergy_B_Patients.Weight)
004  WHERE (patient_bodyheight<5ft)

More specifically, the exemplary SQL query of Table III is executed on two tables, i.e., the tables "Allergy_A_Patients" and "Allergy_B_Patients" (line 002) having a multiplicity of columns including a "weight" and "patient_bodyheight" column. The "Allergy_A_Patients" table includes the data on patients having the allergy "A" and the "Allergy_B_Patients" table includes the data on patients having the allergy "B". By way of example, these two tables are joined by a JOIN statement (line 002). Illustratively, an "INNER JOIN" statement has been selected to join the tables. However, any other type of JOIN statement is also contemplated. The "INNER JOIN" joins both tables on columns including data about weights of respective patients. More specifically, according to line 003 the tables are joined on a "Weight" column of the "Allergy_A_Patients" table and a "Weight" column of the "Allergy_B_Patients" table (line 003). The exemplary query of Table III further includes a query condition defined by a WHERE clause (line 004). The WHERE clause in line 004 defines that information relating to individuals having a height of less than "5" feet (patient_age<5 ft) should be retrieved.

Method 1200 starts at step 1210. At step 1220, an event is detected. More specifically, in one embodiment an event with respect to one or more databases (e.g., data source 1010 and 1020 of FIG. 10) is detected at step 1220. At step 1230, it is determined whether the event is a request to execute a query against the database(s). If the event is not a request for query execution, processing returns to step 1220 and waits until detection of a subsequent event. If, however, the event is a request for executing a query, processing continues at step 1240.

At step 1240, it is determined whether the query contains result fields (e.g., result fields 1070 of FIG. 10) included in a JOIN statement for joining at least two different database tables. In the example given in Table III above, the SQL query contains a JOIN statement over the result fields "Allergy_A_Patients.Weight" and "Allergy_B_Patients.Weight" in lines 002-003.

If the SQL query does not contain a JOIN statement, the SQL query is executed against the database(s) at step 1270 and processing returns to step 1220. If, however, the SQL query contains a JOIN statement, the corresponding result fields included in the JOIN statement are determined. At step 1250 it is determined whether units metadata is associated with columns of the different database tables to be joined. If the columns have associated units metadata, it is further determined at step 1250, whether the units metadata of the columns indicate different measurement units. If the columns do not have associated units metadata or if the measurement units included in the associated units metadata are identical, the SQL query is executed against the database(s) at step 1270 and processing returns to step 1220. If, however, the measurement units are not identical, all values of one joined column are converted into values of a measurement unit of another joined column at step 1260. In the given example, assume that the weights in the "Weight" column of the "Allergy_A_Patients" table are given in "kg" and that the weights in the "Weight" column of the "Allergy_B_Patients" table are given in "lb". Accordingly, at step 1260, all values of the "Weight" column of the "Allergy_B_Patients" table can be converted into values given in "kg" according to the "Weight" column of the "Allergy_A_Patients" table. This conversion can be performed using a suitable conversion algorithm, such as the conversion algorithm indicated in line 003 of Table II. Then, at step 1270, the query is executed and processing returns to step 1220.

Figure 13:
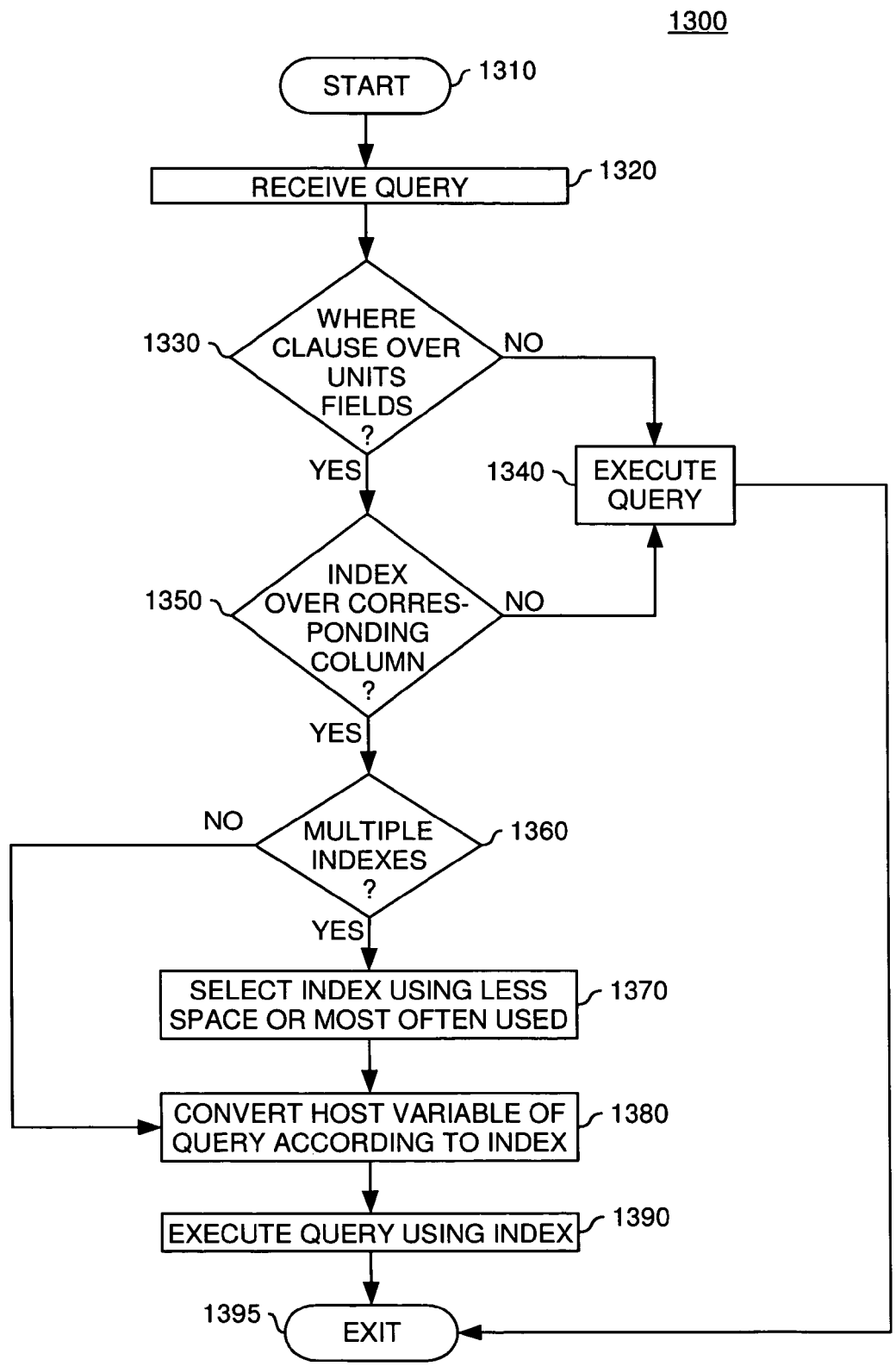
FIG. 13 is a flow chart illustrating query execution using unit conversion in another embodiment.

Referring now to FIG. 13, one embodiment of a method 1300 for using units metadata (e.g., units metadata 1014 or 1024 of FIG. 10) in execution of a query (e.g., query 1060 of FIG. 10) having a WHERE clause is shown. Method 1300 starts at step 1310. At step 1320, a query against one or more databases (e.g., data source 1010 and 1020 of FIG. 10) is received. At step 1330, it is determined whether the query contains a WHERE clause over a result field (e.g., one of result fields 1070 of FIG. 10) having associated units metadata. If it is determined that the query does not contain a corresponding WHERE clause, the query is executed at step 1340 and method 1300 then exits at step 1395. If, however, the query contains a WHERE clause over a result field having associated units metadata, it is determined at step 1350 whether an index over a column corresponding to the result field exists. By way of example, the index can be a bitmap index or an encoded vector index (EVI). If no such index exists, the query is executed at step 1340 and method 1300 then exits at step 1395. If, however, an index exists, it is determined at step 1360 whether multiple indexes over the column exist. If it is determined that only one index exists, the index is selected and processing continues at step 1380. Otherwise, processing continues at step 1370.

At step 1370, an index is selected from the multiple indexes. In one embodiment, the index requiring less memory space or the index which is most often used is selected. In one embodiment where multiple indexes with different associated measurement units are provided, the associated measurement units can be used as a selection criterion. More specifically, if the associated units metadata of the result field indicates a measurement unit "kg", only indexes provided in "kg" may be considered for selection. Accordingly, processing can be accelerated and, thus, use of processing resources can be optimized.

At step 1380, a measurement unit associated with the selected index is determined. Then, a host variable included in the WHERE clause of the query is converted into the measurement unit associated with the index. For instance, in the example given in Table III, the host variable in the WHERE clause in line 004 is "5". For purposes of illustration, this host variable is associated with the measurement unit "ft" (i.e., feet). Assume now that the index is defined using the measurement unit "m" (i.e., meter). Accordingly, at step 1380 the host variable "5" given in "ft" is converted into a host variable given in "m". This conversion can be performed using a suitable conversion algorithm, such as a conversion algorithm indicated in a conversion table (e.g., Table II). Taking into consideration that 1 ft=0.3048 m, the host variable "5" can be converted into "1.524".

Thus, at step 1390 the query can be executed using the selected index. Data of an obtained query result having the measurement unit associated with the index can then be converted into data having the initial measurement unit of the host variable. Method 1300 then exits at step 1395.

Figure 14:
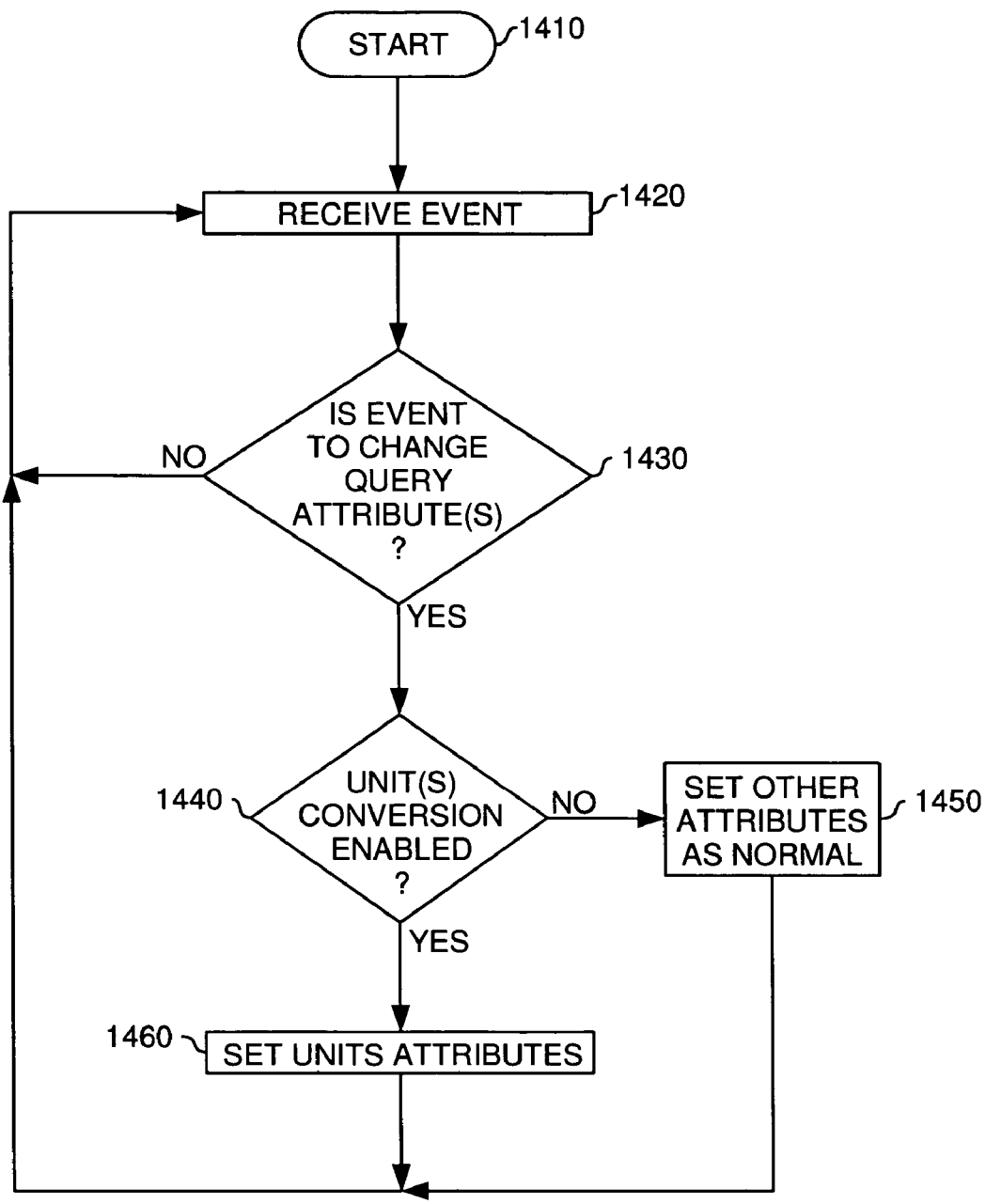
FIG. 14 is a flow chart illustrating a change of query attributes in one embodiment.

Referring now to FIG. 14, one embodiment of a method 1400 for using units metadata (e.g., units metadata 1014 or 1024 of FIG. 10) in generating appropriate code for execution of a query (e.g., query 1060 of FIG. 10) is shown. Method 1400 starts at step 1410. At step 1420, an event is detected. More specifically, in one embodiment an event with respect to one or more databases (e.g., data source 1010 and 1020 of FIG. 10) is detected at step 1420. At step 1430, it is determined whether the event is to change attributes of a query, such as the exemplary SQL query of Table III, to be executed against the database(s). For instance, the SQL query searches for data in a first measurement unit, but the data is given in a second measurement unit in the column of the database table. Therefore, the query attributes are changed from the first to the second measurement unit.

If the event is not a request for changing query attributes, processing returns to step 1420 and waits until detection of a subsequent event. If, however, the event is a request for changing query attributes, processing continues at step 1440. At step 1440, it is determined whether units conversion is enabled. For instance, it can be determined at database level whether a corresponding flag for enablement of units conversion is set for a given category of measurement (e.g., weight, length, volume, etc.). Exemplary system parameters to this end are illustrated in Table IV below.

TABLE IV

| EXEMPLARY SYSTEM PARAMETERS | |
| --- | --- |
| 001 | Units_change = y, length=m |
| 002 | Units_change = n, weight |

Illustratively, the exemplary system parameters of Table IV include a first parameter (line 001) indicating that change of a "length" measurement unit in a query is enabled (Units_change=y). Line 001 further indicates, that the measurement unit should be changed to "m" (length=m). The exemplary system parameters of Table IV further include a second parameter (line 002) indicating that change of a "weight" measurement unit in a query is disabled (Units_change=n).

If it is determined that units conversion is disabled, all query attributes, other than units attributes, of the query are set according to conventional techniques and method 1400 then returns to step 1420. However; if it is determined that units conversion is enabled, the corresponding query attributes are converted on the basis of predefined system parameters (e.g., system parameters of Table IV) and processing then returns to step 1420. In the exemplary query of Table III, the measurement unit "ft" (line 004) would accordingly be changed in the query to "m".

Figure 15:
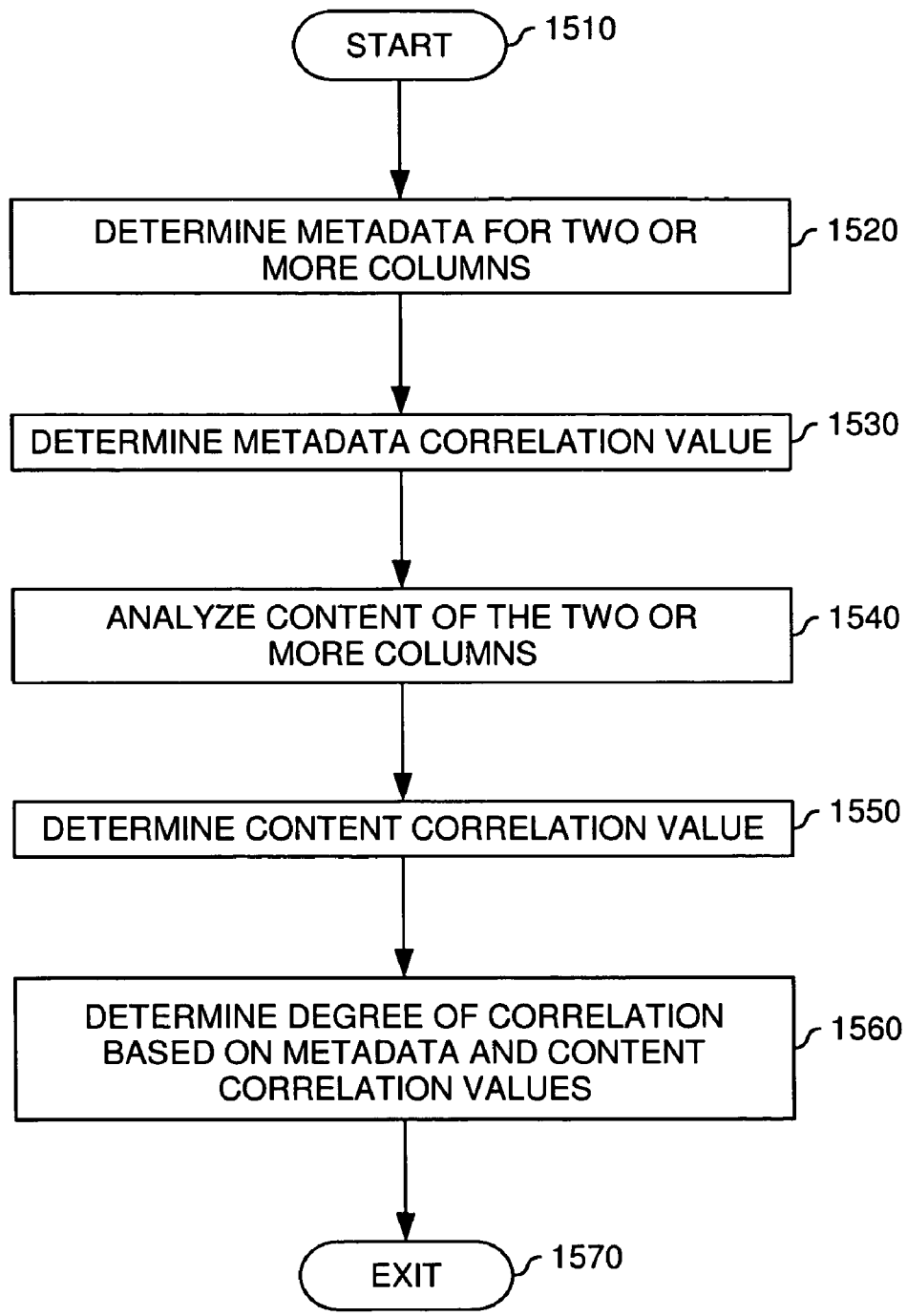
FIG. 15 is a flow chart illustrating identification of mergeable columns in one embodiment.

As was noted above, units metadata may further be used for identifying correlated columns from one or more database tables. An exemplary embodiment for using units metadata accordingly is described in the following with reference to FIG. 15. By way of example, the method 1500 is explained with respect to columns of a first and a second database table (e.g., database tables 114 and 124 or 1018 and 1028). However, it should be noted that the invention is not so limited and that the method 1500 can also be used for determining correlations between columns of a single database table. Furthermore, for brevity and simplicity, method 1500 is explained in the following with respect to a first and a second column from the first and second database tables, respectively. At least part of the steps of the method 1500 can be performed by a correlation manager (e.g., correlation manager 150 of FIG. 1) or a units metadata manager (e.g., units metadata manager 1050). Method 1500 starts at step 1510.

In one embodiment, at step 1520 units metadata (e.g., units metadata 1014 and 1024) for the first and second columns is determined. However, it should be noted that any type of metadata can be used and is, therefore, broadly contemplated. At step 1530, the units metadata of the first and second columns is compared and a first correlation value is determined. The first correlation value indicates a degree of similarity between the units metadata of the first and second columns.

At step 1540, content from the first and second columns is analyzed. For instance, a statistical comparison (as described above with reference to FIGS. 6A-B) or an ontological comparison (as described above with reference to FIG. 8) is performed on the content of the first and second columns. At step 1550, the content from the first and second columns is compared and a second correlation value is determined. The second correlation value indicates a degree of similarity between the content from the first and second columns.

At step 1560, a degree of correlation between the first and second columns is determined on the basis of the first and second correlation values. By way of example, a sum of the first and second correlation values can be compared with a predetermined threshold. According to one aspect, the sum may be a weighted sum in which either or both of the first and second correlation values is multiplied by a weighting factor. For example, the second correlation value may be considered more important than the first correlation value since the second correlation value relates to a comparison of the contents. Accordingly, the second correlation value may be given more weight. In any case, if the sum exceeds the predetermined threshold, it is assumed that the first and second columns are correlated. In this case, a message can be displayed to a user indicating that the first and second columns are correlated. In one embodiment, the user can thus make a decision on whether to merge the correlated columns. Accordingly, in response to an appropriate input from the user, the correlated columns are merged. Method 1500 then exits at step 1570.

While the foregoing is directed to embodiments of the present invention, other and further embodiments of the invention may be devised without departing from the basic scope thereof, and the scope thereof is determined by the claims that follow.

What is claimed is:

1. A computer-implemented method for identifying correlated columns from database tables, comprising:
    determining correlation attributes for a first column and a second column from one or more database tables, the correlation attributes describing for each column at least one of the column and content of the column;
    comparing the correlation attributes from the first and second column;
    identifying similarities between the first and second column on the basis of the comparison;
    on the basis of the identified similarities, determining whether the first and second column are correlated;
    upon determining the first and second columns are correlated, merging the first and second columns to create a third column that contains each data value stored in the first and second columns; and
    storing the third column in the database.

2. The method of claim 1, wherein identifying the similarities comprises:
    determining a correlation value indicating a degree of correlation between the first and the second column; and
    determining whether the correlation value exceeds a predetermined threshold.

3. The method of claim 1, further comprising:
    if it is determined that the first and second column are correlated, displaying an indication to a user that the first and second column can be merged; and
    in response to user input, merging the first and second column into a single column.

4. The method of claim 1, wherein the first column is a column of a first database table and the second column is a column of a second database table, the method further comprising:
    determining correlation attributes for N columns from the first database table and M columns from the second database table, where N and M are integers;
    comparing the correlation attributes from each of the N columns with the correlation attributes from each of the M columns to identify similarities between the N and M columns; and
    on the basis of the identified similarities, determining whether one or more of the N and M columns are correlated.

5. The method of claim 4, further comprising merging each of the one or more of the N and M columns determined to be correlated.

6. The method of claim 1, further comprising:
    determining, from the one or more database tables, metadata describing characteristics of each column; and
    wherein the correlation attributes are determined on the basis of the determined metadata.

7. The method of claim 6, wherein the determined metadata describes for each column an attribute of a data value in the column.

8. The method of claim 6, wherein the determined metadata describes for each column at least one of:
    (i) a label;
    (ii) a comment;
    (iii) a constraint;
    (iv) a trigger;
    (v) a name;
    (vi) a data type; and
    (vii) a column length.

9. The method of claim 1, further comprising:
    determining, from the one or more database tables, statistical parameters associated with each of the columns; and
    wherein the correlation attributes are determined on the basis of the determined statistical parameters.

10. The method of claim 9, wherein the determined statistical parameters describe for each column at least one of:
    (i) a minimum value;
    (ii) a maximum value;
    (iii) an average value; and
    (iv) a range of values.

11. The method of claim 1, further comprising:
    determining, from the one or more database tables, ontological properties describing cognitive qualities associated with each column; and
    wherein the correlation attributes are determined on the basis of the determined ontological properties.

12. The method of claim 11, wherein the determined ontological properties describe for each column at least one of:
    (i) a synonym;
    (ii) a parent node; and
    (iii) an ancestor node.

13. The method of claim 11, further comprising:
    determining, from the one or more database tables, metadata describing the ontological properties.

14. The method of claim 1, further comprising:
    determining, from the one or more database tables, measurement units associated with each column; and
    wherein the correlation attributes are determined on the basis of the determined measurement units.

15. The method of claim 14, further comprising:
    determining, from the one or more database tables, metadata describing the measurement units.

16. The method of claim 14, wherein identifying the similarities comprises:
    determining whether the first and second column are associated with similar measurement units.

17. A computer-implemented method for identifying correlated columns from database tables, comprising:
    determining metadata for at least two columns from one or more database tables, the metadata describing characteristics of each column;
    analyzing content from the at least two columns from the one or more database tables;
    determining a degree of correlation between the at least two columns using the determined metadata and the analyzed content; and
    storing the value representing the degree of correlation in the database.

18. The method of claim 17, wherein determining the degree of correlation comprises:
    assigning a first correlation value to the determined metadata;
    assigning a second correlation value to the analyzed content, wherein the first and second correlation values are different; and
    calculating a total correlation value on the basis of the first and second correlation values.

19. The method of claim 18, further comprising:
    merging the at least two columns if the total correlation value exceeds a predetermined threshold value.

20. The method of claim 17, wherein analyzing the content comprises determining statistical parameters from the content of each column.

21. The method of claim 17, further comprising:
    merging the first and the at least one second column if it is determined that the first and at least one second column are correlated.

22. A computer readable storage medium containing a program which, when executed, performs a process for identifying correlated columns from database tables, the process comprising:
    determining correlation attributes for a first column and a second column from one or more database tables, the correlation attributes describing for each column at least one of the column and content of the column;
    comparing the correlation attributes from the first and second column;
    identifying similarities between the first and second column on the basis of the comparison;
    on the basis of the identified similarities, determining whether the first and second column are correlated;
    upon determining the first and second columns are correlated, merging the first and second columns to create a third column that contains each data value stored in the first and second columns; and
    storing the third column in the database.

23. The computer readable medium of claim 22, wherein identifying the similarities comprises:
    determining a correlation value indicating a degree of correlation between the first and the second column; and
    determining whether the correlation value exceeds a predetermined threshold.

24. The computer readable medium of claim 22, wherein the process further comprises:
    if it is determined that the first and second column are correlated, displaying an indication to a user that the first and second column can be merged; and
    in response to user input, merging the first and second column into a single column.

25. The computer readable medium of claim 22, wherein the first column is a column of a first database table and the second column is a column of a second database table, the process further comprising:
    determining correlation attributes for N columns from the first database table and M columns from the second database table, where N and M are integers;
    comparing the correlation attributes from each of the N columns with the correlation attributes from each of the M columns to identify similarities between the N and M columns; and
    on the basis of the identified similarities, determining whether one or more of the N and M columns are correlated.

26. The computer readable medium of claim 25, wherein the process further comprises:
   merging each of the one or more of the N and M columns determined to be correlated.

27. The computer readable medium of claim 22, wherein the process further comprises:
   determining, from the one or more database tables, metadata describing characteristics of each column; and
   wherein the correlation attributes are determined on the basis of the determined metadata.

28. The computer readable medium of claim 27, wherein the determined metadata describes for each column an attribute of a data value in the column.

29. The computer readable medium of claim 27, wherein the determined metadata describes for each column at least one of:
   (i) a label;
   (ii) a comment;
   (iii) a constraint;
   (iv) a trigger;
   (v) a name;
   (vi) a data type; and
   (vii) a column length.

30. The computer readable medium of claim 22, wherein the process further comprises:
   determining, from the one or more database tables, statistical parameters associated with each of the columns; and
   wherein the correlation attributes are determined on the basis of the determined statistical parameters.

31. The computer readable medium of claim 30, wherein the determined statistical parameters describe for each column at least one of:
   (i) a minimum value;
   (ii) a maximum value;
   (iii) an average value; and
   (iv) a range of values.

32. The computer readable medium of claim 22, wherein the process further comprises:
   determining, from the one or more database tables, ontological properties describing cognitive qualities associated with each column; and
   wherein the correlation attributes are determined on the basis of the determined ontological properties.

33. The computer readable medium of claim 32, wherein the determined ontological properties describe for each column at least one of:
   (i) a synonym;
   (ii) a parent node; and
   (iii) an ancestor node.

34. The computer readable medium of claim 32, wherein the process further comprises:
   determining, from the one or more database tables, metadata describing the ontological properties.

35. The computer readable medium of claim 22, wherein the process further comprises:
   determining, from the one or more database tables, measurement units associated with each column; and
   wherein the correlation attributes are determined on the basis of the determined measurement units.

36. The computer readable medium of claim 35, wherein the process further comprises:
   determining, from the one or more database tables, metadata describing the measurement units.

37. The computer readable medium of claim 35, wherein identifying the similarities comprises:
   determining whether the first and second column are associated with similar measurement units.

38. A computer readable storage medium containing a program which, when executed, performs a process for identifying correlated columns from database tables, the process comprising:
   determining metadata for at least two columns from one or more database tables, the metadata describing characteristics of each column;
   analyzing content from the at least two columns from the one or more database tables; and
   determining a degree of correlation between the at least two columns using the determined metadata and the analyzed content; and
   storing the value representing the degree of correlation in the database.

39. The computer readable medium of claim 38, wherein determining the degree of correlation comprises:
   assigning a first correlation value to the determined metadata;
   assigning a second correlation value to the analyzed content, wherein the first and second correlation values are different; and
   calculating a total correlation value on the basis of the first and second correlation values.

40. The computer readable medium of claim 39, wherein the process further comprises:
   merging the at least two columns if the total correlation value exceeds a predetermined threshold value.

41. The computer readable medium of claim 38, wherein analyzing the content comprises:
   determining statistical parameters from the content of each column.

42. The computer readable medium of claim 38, wherein the process further comprises:
   merging the first and the at least one second column if it is determined that the first and at least one second column are correlated.

43. A data processing system, comprising:
   a processor;
   at least one database having one or more database tables; and
   a correlation manager for identifying correlated columns from the one or more database tables, the correlation manager which, when executed by the processor, is configured for:
      determining correlation attributes for a first column and a second column from the one or more database tables, the correlation attributes describing for each column at least one of the column and content of the column;
      comparing the correlation attributes from the first and second column;
      identifying similarities between the first and second column on the basis of the comparison;
      on the basis of the identified similarities, determining whether the first and second column are correlated;
      upon determining the first and second columns are correlated, merging the first and second columns to create a third column that contains each data value stored in the first and second columns; and
      storing the third column in the database.

44. A data processing system, comprising:
a processor;
at least one database having one or more database tables; and
a correlation manager for identifying correlated columns from the one or more database tables, the correlation manager which, when executed by the processor, is configured for:
  determining metadata for at least two columns from the one or more database tables, the metadata describing characteristics of each column;
  analyzing content from the at least two columns from the one or more database tables; and
  determining a degree of correlation between the at least two columns using the determined metadata and the analyzed content; and
  storing the value representing the degree of correlation in the database.

* * * * *